United States Patent
Srinivasan et al.

(10) Patent No.: US 10,482,890 B2
(45) Date of Patent: *Nov. 19, 2019

(54) DETERMINING MEDIA DEVICE ACTIVATION BASED ON FREQUENCY RESPONSE ANALYSIS

(71) Applicant: The Nielsen Company (US), LLC, New York, NY (US)

(72) Inventors: Venugopal Srinivasan, Palm Harbor, FL (US); Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,373

(22) Filed: Aug. 2, 2017

(65) Prior Publication Data

US 2017/0330570 A1 Nov. 16, 2017

Related U.S. Application Data

(63) Continuation of application No. 14/542,155, filed on Nov. 14, 2014, now Pat. No. 9,747,906.

(51) Int. Cl.
*G10L 19/00* (2013.01)
*G10L 19/018* (2013.01)
(Continued)

(52) U.S. Cl.
CPC .......... *G10L 19/018* (2013.01); *G10L 19/008* (2013.01); *H04H 60/31* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,677,466 A | 6/1987 | Lert, Jr. et al. | |
| 5,289,545 A | 2/1994 | Jestice | |

(Continued)

FOREIGN PATENT DOCUMENTS

WO 2006014344 2/2006

OTHER PUBLICATIONS

International Searching Authority, "International Search Report and Written Opinion", issued in connection with International Patent Application No. PCT/US2015/060687, dated Apr. 20, 2016 (10 pages).

(Continued)

*Primary Examiner* — Vu B Hang
(74) *Attorney, Agent, or Firm* — Hanley, Flight & Zimmerman, LLC

(57) ABSTRACT

Methods, apparatus, systems and articles of manufacture (e.g., physical storage media) to determine media device activation based on frequency response analysis are disclosed. Example methods disclosed herein include reusing first frequency values of audio sensed with a microphone to determine a first frequency response of the sensed audio, the first frequency values having been determined to perform watermark detection during a first monitoring time interval. Disclosed example methods also include comparing the first frequency response to a reference frequency response to determine whether the media device was active during the first monitoring time interval.

20 Claims, 12 Drawing Sheets

(51) Int. Cl.
*G10L 19/008* (2013.01)
*H04H 60/31* (2008.01)
*H04H 60/58* (2008.01)
*H04N 21/439* (2011.01)
*H04N 21/442* (2011.01)
*G10L 21/038* (2013.01)
*G10L 19/24* (2013.01)

(52) U.S. Cl.
CPC ........ *H04H 60/58* (2013.01); *H04N 21/4394* (2013.01); *H04N 21/44222* (2013.01); *H04N 21/44231* (2013.01); *G10L 19/24* (2013.01); *G10L 21/038* (2013.01)

(56) References Cited

U.S. PATENT DOCUMENTS

| | | | |
|---|---|---|---|
| 5,481,294 | A | 1/1996 | Thomas et al. |
| 7,020,349 | B2 | 3/2006 | Brunk |
| 7,222,071 | B2 | 5/2007 | Neuhauser et al. |
| 7,343,615 | B2 | 3/2008 | Nelson et al. |
| 7,460,684 | B2 | 12/2008 | Srinivasan |
| 7,643,090 | B2 | 1/2010 | Ramaswamy et al. |
| 7,917,111 | B2 | 3/2011 | Szcublewski et al. |
| 8,060,372 | B2 | 11/2011 | Topchy et al. |
| 8,359,205 | B2 | 1/2013 | Srinivasan et al. |
| 8,369,972 | B2 | 2/2013 | Topchy et al. |
| 8,768,714 | B1 | 7/2014 | Blesser |
| 9,747,906 | B2 * | 8/2017 | Srinivasan ............ G10L 19/018 |
| 2003/0046685 | A1 | 3/2003 | Srinivasan et al. |
| 2003/0054757 | A1 | 3/2003 | Kolessar et al. |
| 2005/0232411 | A1 | 10/2005 | Srinivasan et al. |
| 2006/0153296 | A1 | 7/2006 | Deng |
| 2006/0184961 | A1 | 8/2006 | Lee et al. |
| 2006/0195861 | A1 | 8/2006 | Lee |
| 2007/0168409 | A1 | 7/2007 | Cheung |
| 2007/0274537 | A1 | 11/2007 | Srinivasan |
| 2008/0091288 | A1 | 4/2008 | Srinivasan |
| 2008/0144880 | A1 | 6/2008 | DeLuca |
| 2008/0263579 | A1 | 10/2008 | Mears et al. |
| 2008/0276265 | A1 | 11/2008 | Topchy et al. |
| 2010/0106510 | A1 | 4/2010 | Topchy et al. |
| 2010/0195837 | A1 | 8/2010 | Srinivasan et al. |
| 2010/0223062 | A1 | 9/2010 | Srinivasan et al. |
| 2011/0015968 | A1 | 1/2011 | Carlson |
| 2012/0203363 | A1 | 8/2012 | McKenna et al. |
| 2012/0311620 | A1 * | 12/2012 | Conklin ................ H04H 60/32 725/14 |
| 2013/0171926 | A1 | 7/2013 | Perret et al. |
| 2014/0007153 | A1 | 1/2014 | Nielsen et al. |
| 2014/0323034 | A1 | 10/2014 | Wang |

OTHER PUBLICATIONS

United States Patent and Trademark Office, "Non-Final Office Action", issued in connection with U.S. Appl. No. 14/542,155, dated Dec. 27, 2016 (6 pages).

United States Patent and Trademark Office, "Notice of Allowance", issued in connection with U.S. Appl. No. 14/542,155, dated Apr. 24, 2017 (8 pages).

* cited by examiner

DETERMINING MEDIA DEVICE ACTIVATION BASED ON FREQUENCY RESPONSE ANALYSIS

RELATED APPLICATION(S)

This patent arises from a continuation of U.S. patent application Ser. No. 14/542,155 (now U.S. Pat. No. 9,747,906), which is entitled "DETERMINING MEDIA DEVICE ACTIVATION BASED ON FREQUENCY RESPONSE ANALYSIS," and which was filed on Nov. 14, 2014. U.S. patent application Ser. No. 14/542,155 is hereby incorporated by reference in its entirety. Priority to U.S. patent application Ser. No. 14/542,155 is hereby expressly claimed.

FIELD OF THE DISCLOSURE

This disclosure relates generally to media device monitoring and, more particularly, to determining media device activation based on frequency response analysis.

BACKGROUND

Media monitoring systems typically include one or more device meters to monitor media presented by one or more media devices located at one or more monitored sites. In some examples, the device meters employed by the media monitoring systems use watermarks (also referred to as codes) decoded from the presented media, and/or signatures (also referred to as media fingerprints or just fingerprints) generated from the presented media, or both, to monitor (e.g., identify and/or track) the media being presented by the monitored media devices. Some media monitoring systems further employ media device activation detectors (also referred to as on/off detectors) to detect whether the monitored media devices are active (e.g., turned on) or inactive (e.g., turned off) to verify whether the decoded watermarks and/or generated signatures actually correspond to media presented by the media devices.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
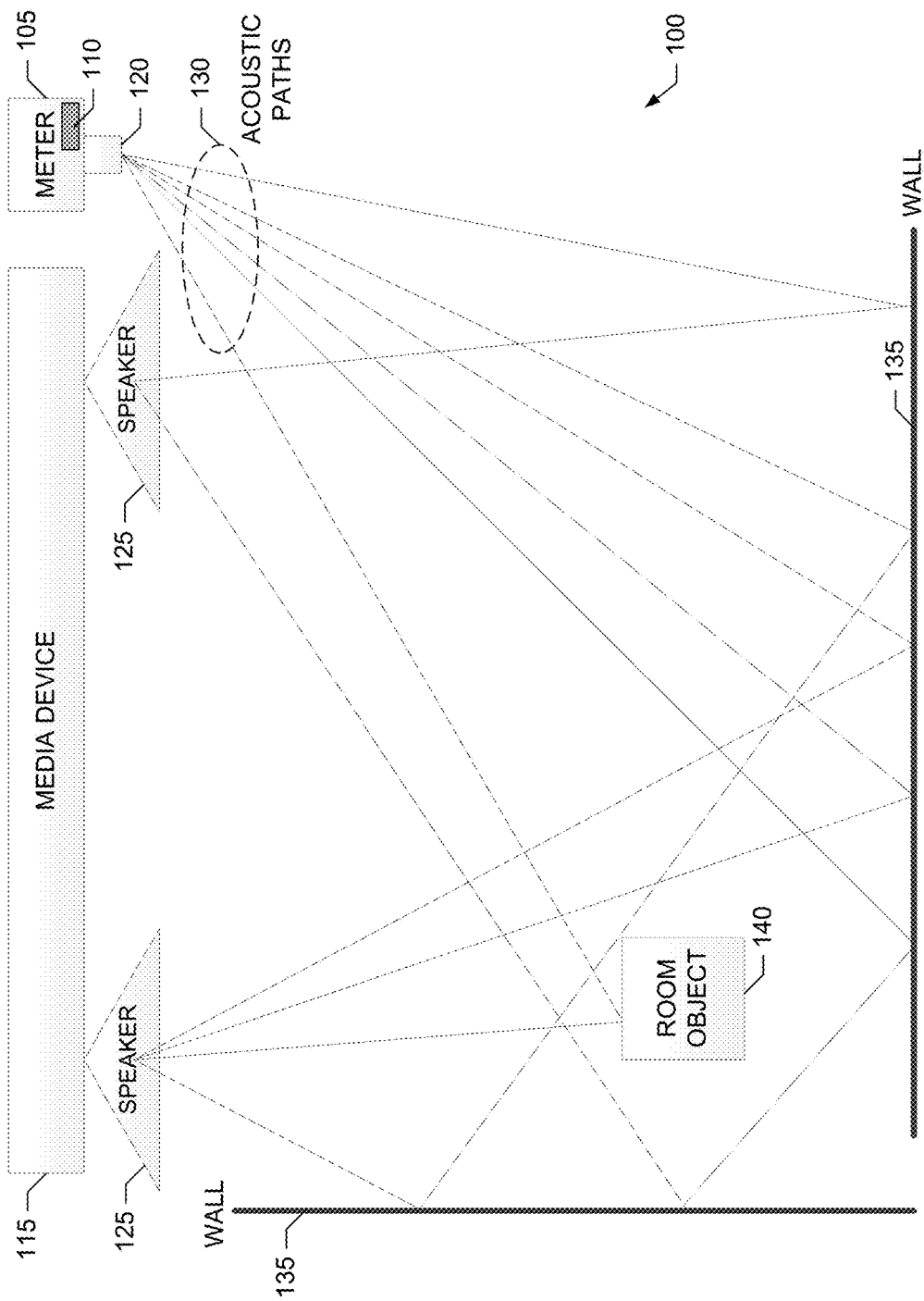
FIG. 1 is a block diagram of an example monitored site including an example device meter implementing an example device activation detector to detect whether an example monitored media device is active based on frequency response analysis as disclosed herein.

Methods, apparatus, systems and articles of manufacture (e.g., physical storage media) to determine media device activation based on frequency response analysis are disclosed. Example methods disclosed herein include determining a reference frequency response based on first frequency values of an audio signal used to perform watermark detection for a first time interval during which a media device has been determined to be active. Such example methods also include determining a second frequency response based on second frequency values of the audio signal used to perform watermark detection for a second time interval different from the first time interval. Such example methods further include comparing the second frequency response with the reference frequency response to determine whether the media device was active during the second time interval.

In some disclosed example methods, comparing the second frequency response with the reference frequency response includes determining a value of a dot product of the second frequency response and the reference frequency response. Some such example methods also include comparing the value of the dot product to a threshold to determine whether the media device was active during the second time interval.

Additionally or alternatively, some disclosed example methods further include, in response to determining that a valid watermark was detected when performing watermark detection for the first time interval using the first frequency values, determining that the media device was active during the first time interval.

Additionally or alternatively, some disclosed example methods further include determining a third frequency response based on third frequency values of the audio signal used to perform watermark detection for a third time interval after the first time interval. Some such example methods also include, in response to determining that a valid watermark was detected when performing watermark detection for the third time interval, replacing the reference frequency response with the third frequency response. Some such example methods further include comparing the third frequency response with the reference frequency response (e.g., prior to replacing the reference frequency response with the third frequency response), and, in response to determining that the third frequency response does not match the reference frequency response, indicating that at least one of: (i) the media device moved relative to a position of the media device during the first time interval, or (ii) an environment in which the media device is in operation has changed relative to an arrangement of the environment during the first time interval.

Additionally or alternatively, in some disclosed example methods, comparing the second frequency response with the reference frequency response is performed in response to determining that no valid watermark was detected when performing watermark detection for the second time interval. Also, some such disclosed example methods further include, when no valid watermark was detected when performing watermark detection for the second time interval, conditioning whether to determine a signature from a portion of the audio signal corresponding to the second time interval based on whether the comparing of the second frequency response with the reference frequency response indicates that the media device was active during the second time interval.

Additionally or alternatively, some disclosed example methods further include conserving processing resources by disabling further generation of monitoring data using a portion of the audio signal corresponding to the second time interval in response to determining that, based on the comparing of the second frequency response with the reference frequency response, the media device was inactive during the second time interval.

These and other example methods, apparatus, systems and articles of manufacture (e.g., physical storage media) to determine media device activation based on frequency response analysis are disclosed in further detail below.

As noted above, some prior media monitoring systems employ media device activation detectors (also referred to as on/off detectors) to detect whether monitored media devices are active (e.g., turned on) or inactive (e.g., turned off). By determining whether a monitored media device is active or inactive, such media monitoring systems can verify whether decoded watermarks and/or generated signatures actually correspond to media presented by a monitored media device. However, in prior media monitoring systems, such media device activation detectors are typically separate from the device meters employed to decode watermarks and/or generate signatures from the media presented by the monitored media devices, or are included in the device meters but use processing resources in addition to the processing resources already employed to perform watermark decoding and/or signature detection.

In contrast with such prior media device activation detectors, media device activation detection based on frequency response analysis, as disclosed herein, is able to reuse frequency values of an audio signal determined when performing watermark detection on the audio signal. By reusing the frequency values that were already determined when performing watermark detection, media device activation detection based on frequency response analysis as disclosed herein is able to reduce the amount of a device meter's processing resources utilized to determine whether a monitored media device is active. Furthermore, unlike prior media device activation detectors, which may be limited to determining whether a monitored media device is active, media device activation detection based on frequency response analysis as disclosed herein is also able to ascertain whether the monitored media device has moved relative to a prior position, or whether an environment in which the media device is operating has changed, in addition to determining whether the monitored media device is active. Moreover, in at least some examples, media device activation detection based on frequency response analysis as disclosed herein can conserve processing resources and reduce power consumption by disabling further generation of monitoring data during a monitoring interval in response to determining that, based on the frequency response analysis, the media device was inactive during the monitoring interval. These and other potential benefits associated media device activation detection based on frequency response analysis are described in further detail below.

Turning to the figures, a block diagram of an example monitored site 100 including an example device meter 105 implementing an example device activation detector 110 to detect whether an example monitored media device 115 is active based on frequency response analysis, as disclosed herein, is illustrated in FIG. 1. In the illustrated example of FIG. 1, the device meter 105 includes an example microphone 120 to sense audio in the monitored site 100 and to produce a resulting sensed audio signal for processing by the device meter 105. The example microphone 120 may be implemented by any number and/or type(s) of microphones, acoustic sensors, transducers, etc. As described in further detail below, the sensed audio signal output from the microphone 120 is processed by the device meter 105 to monitor media presented by the media device 115. In the illustrated example, the media monitored by the device meter 105 can correspond to any type of media presentable by the media device 115. For example, monitored media can correspond to media content, such a television programs, radio programs, movies, etc., as well as commercials, advertisements, etc. In the illustrated example, the device meter 105 determines metering data that may identify and/or be used to identify media presented by the media device 115 (and, thus, infer media exposure) at the monitored site 100.

In the illustrated example, the media device 115 monitored by the device meter 105 can correspond to any type of audio, video and/or multimedia presentation device capable of presenting media audibly and/or visually. For example, the media device 115 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. As other examples, the media device 115 can correspond to a multimedia computer system, a personal digital assistant, a cellular/mobile smartphone, a radio, a tablet computer, etc.

When the media device 115 in the example monitored site 100 is active (e.g., turned on), the sensed audio signal obtained by the microphone 120 will likely include audio emanating from one or more speakers of the media device 115, such as the example speaker(s) 125. Furthermore, in a typical environment such as the example monitored site 100, the audio emanating from the speaker(s) 125 of the media device 115 may take one or more example acoustic paths 130 to reach the microphone 120. Such example acoustic paths 130 may include a direct acoustic path and/or one or more indirect paths resulting from the audio emanating from the speaker(s) 125 and reflecting off of one or more walls, such as the example walls 135, and/or reflecting off of one or more objects located in the example monitored site 100, such as the example object 140 illustrated in FIG. 1. The different acoustic paths taken by the audio from the speaker(s) 125 of the media device 115 to the microphone 120 cause multipath interference in the audio sensed by the microphone 120. Due to this multipath interference, some of the frequency components in the frequency spectrum of the sensed audio signal obtained by the microphone 120 may undergo constructive interference and be amplified relative to other frequency components having similar acoustic spectral energies at the point of emission (e.g., at the speaker(s) 125). Additionally or alternatively, other frequency components in the frequency spectrum of the sensed audio signal obtained by the microphone 120 may undergo destructive interference and be attenuated relative to other frequency components having similar acoustic spectral energies at the point of emission (e.g., at the speaker(s) 125).

For a given source of audio in the example monitored site 100, such as the speaker(s) 125 of the media device 115, the multipath interference effects (e.g., the pattern of frequency component amplifications and/or attenuations) observed by the microphone 120, which is assumed to be at a fixed location in the illustrated example, yield a sensed audio signal that was subjected to an acoustic frequency response (e.g., the pattern of frequency component amplifications and/or attenuations) that is a function of the source location (e.g., the location of the speaker(s) 125), the location of the microphone 120, the acoustics of the monitored site 100 (e.g., the arrangement of the objects 140, walls 135, etc. in the room corresponding to the monitored site 100), etc. If these characteristics of the monitored site 100 remain constant, the resulting frequency response may be assumed to characterize the audio emanating from the source location (e.g., the location of the speaker(s) 125). Other audio sources, such as people in the monitored site 100 conversing with each other, other media devices, appliances, etc., included in the monitored site 100, etc., will likely produce different acoustic frequency responses at the microphone 120.

Accordingly, the device meter 105 of the illustrated example includes the example device activation detector 110 to determine whether the media device 115 is active based on analyzing the acoustic frequency response exhibited by the audio signal sensed by the microphone 120. As disclosed in further detail below, the example device activation detector 110 reuses frequency values of the sensed audio signal, which are determined by the meter 105 when performing watermark detection for a given monitoring time interval, to further determine a frequency response exhibited by the sensed audio signal. The device activation detector 110 of the illustrated example then compares the determined frequency response for the given monitoring time interval with a reference frequency response indicative of the media device 115 being active to determine whether the media device 115 was active during the given monitoring time interval. The example device activation detector 110 then uses the result of determining whether the media device 115 was active to further control operation of the example meter 105. Example implementations of the meter 105 and the device activation detector 110 are illustrated in FIGS. 2 and 3, respectively, which are described in further detail below.

Although one example media device 115 is depicted in the illustrated example of FIG. 1, media device activation detection based on frequency response analysis, as disclosed herein, is not limited thereto. Instead, media device activation detection based on frequency response analysis, as disclosed herein, can be used to monitor multiple different media devices included in a monitored site, such as the example monitored site 100. For example, the device activation detector 110 can be structured to determine different reference frequency responses indicative of different respective media devices being active in the monitored site 100. Such a device activation detector 110 can then be structured to compare a determined (e.g., measured) frequency response for a given monitoring time interval to the different reference frequency responses to determine which, if any, of the different respective media devices were active during the monitoring time interval.

Figure 2:
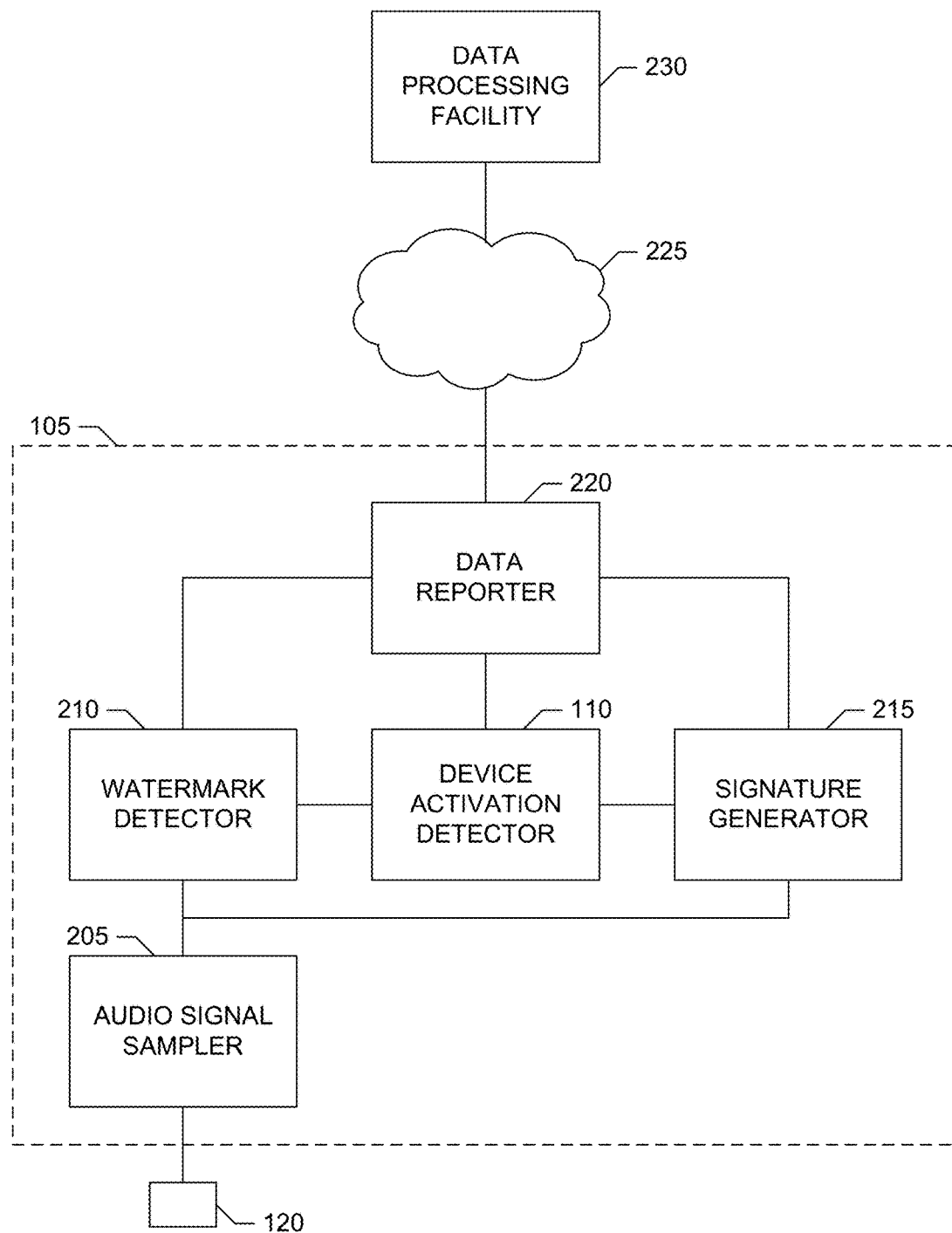
FIG. 2 is a block diagram illustrating an example implementation of the example device meter of FIG. 1 in communication with an example data processing facility.
Figure 3:
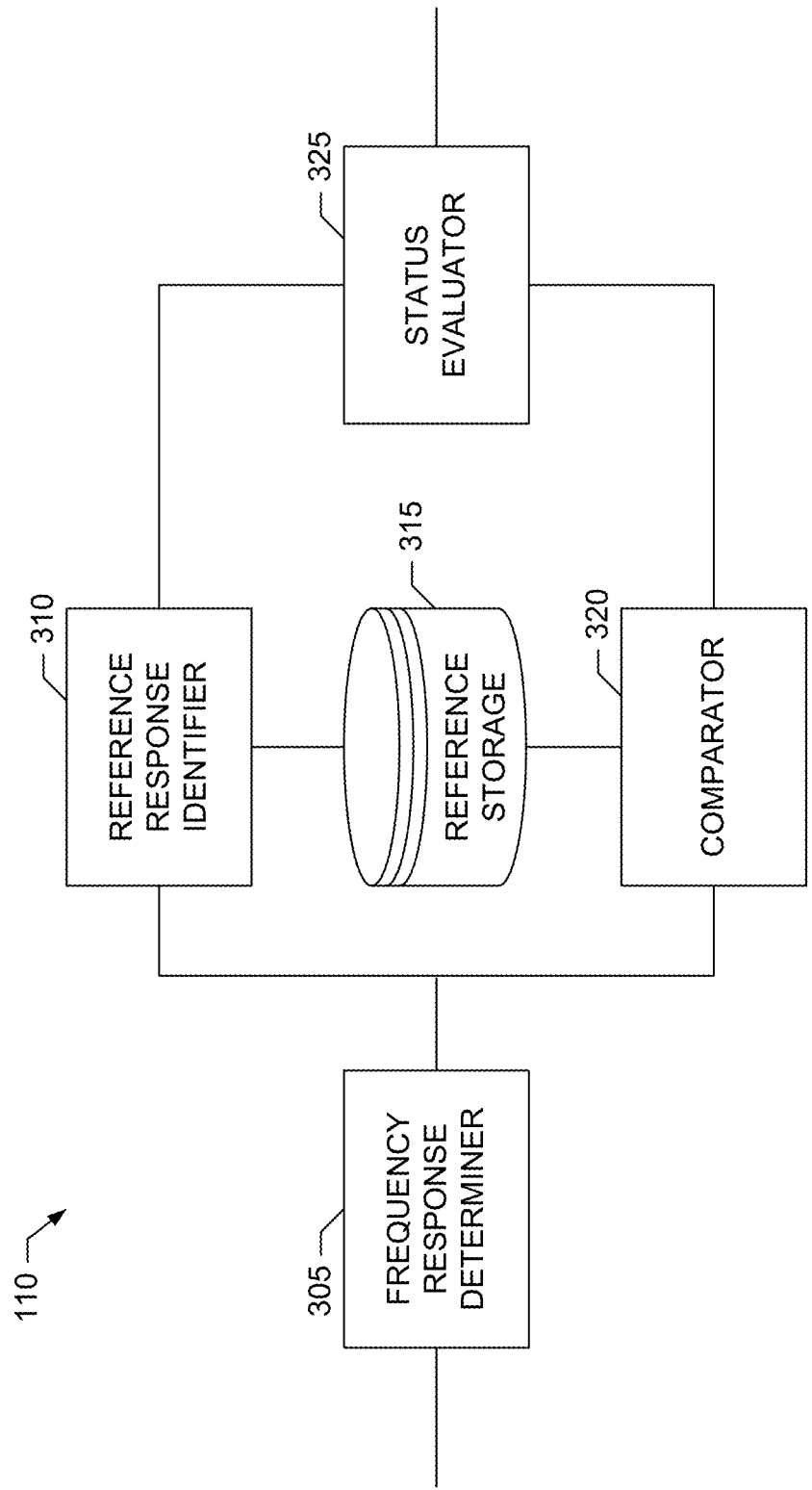
FIG. 3 is a block diagram illustrating an example implementation of the example device activation detector included in the example device meter of FIGS. 1 and/or 2.

A block diagram of an example implementation of the meter 105 of FIG. 1 is illustrated in FIG. 2. As noted above, the example meter 105 of FIG. 2 determines metering data that may identify and/or be used to identify media presented by a monitored media device, such as the example media device 115, at a monitored site, such as the example monitored site 100. Additionally, the example meter 105 of FIG. 2 includes the example device activation detector 110 to determine whether the media device 115 is active based on analyzing the acoustic frequency response exhibited by the audio signal sensed by the microphone 120.

In the illustrated example of FIG. 2, the meter 105 includes an example audio signal sampler 205 to sample the audio signal sensed by the microphone 120. The audio signal sampler 205 samples the audio signal output from the microphone 120 at a given sampling rate, such as a sampling rate of 8 kHz, 16 kHz, 44.1 kHz, or some other value, and performs analog-to-digital conversion to generate audio data from the sensed audio signal. In some examples, the audio signal sampler 205 performs other processing, such as filtering, automatic gain control, etc., on the sensed audio signal output from the microphone 120 and/or the digital audio samples obtained from the sensed audio signal.

The example meter 105 of FIG. 2 also includes an example watermark detector 210 and an example signature generator 215 to determine metering data from the audio signal sensed by the microphone 120. More specifically, the watermark detector 210 of the illustrated example processes the audio data obtained by the audio signal sampler 205 to decode watermarks embedded in and/or otherwise included with an audio portion of media presented by a monitored media device, such as the media device 115. The signature generator 215 of the illustrated example also processes the audio data obtained by the audio signal sampler 205, but generate signatures based on the audio portion of the media presented by the monitored media device, such as the media device 115.

In the context of media monitoring, watermarks may be transmitted within media signals. For example, watermarks can be used to transmit data (e.g., such as identification codes, ancillary codes, etc.) with media (e.g., inserted into the audio, video, or metadata stream of media) to uniquely identify broadcasters and/or media (e.g., content or advertisements), and/or to convey other information. Watermarks are typically extracted using a decoding operation.

In contrast, signatures are a representation of some characteristic of the media signal (e.g., a characteristic of the frequency spectrum of the signal). Signatures can be thought of as fingerprints. Signatures are typically not dependent upon insertion of identification codes (e.g., watermarks) in the media, but instead preferably reflect an inherent characteristic of the media and/or the signal transporting the media. For example, signature-based media monitoring techniques generally use one or more inherent characteristics of the monitored media during a signature sampling interval to generate a substantially unique proxy for the media. Such a proxy is referred to as a signature or media fingerprint, and can take the form of a series of bits, data values, a waveform, etc., representative of the media signal(s) (e.g., an audio signal and/or a video signal) forming the media presentation being monitored. A good signature is usually one that is repeatable when processing the same media presentation, but that is unique relative to other (e.g., different) presentations of other (e.g., different) media. Systems to utilize codes (e.g., watermarks) and/or signatures for media monitoring are long known. See, for example, Thomas, U.S. Pat. No. 5,481,294, which is hereby incorporated by reference in its entirety.

In the illustrated example of FIG. 2, the watermark detector 210 performs one or more decoding procedures to detect watermarks embedded in the audio data obtained by the audio signal sampler 205. For example, the watermark detector 210 may be structured to process the audio data obtained by the audio signal sampler 205 to detect watermarks encoded in one or more frequencies of the sensed audio signal, or otherwise encoded in the frequency domain of the sensed audio signal. Examples of watermarks encoded in the frequency domain of an audio signal and that can be detected using the example watermark detector 310 of FIG. 3 include, but are not limited to, examples described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, and U.S. Publication No. 2010/0223062, entitled "Methods and Apparatus to Perform Audio Watermarking and Watermark Detection and Extraction," which was published on Sep. 2, 2010, all of which are hereby incorporated by reference in their entireties. U.S. Pat. Nos. 8,359,205, 8,369,972 and U.S. Publication No. 2010/0223062 describe example watermarking systems in which a watermark is included in an audio signal by manipulating a set of frequencies of the audio signal.

In some examples, the example watermark detector 210 of FIG. 2 may also be structured to process the audio data obtained by the audio signal sampler 205 to detect watermarks encoded in one or more time domain characteristics of the sensed audio signal, such as by modulating the amplitude and/or phase of the audio signal in the time domain. Examples of watermarks encoded in the time domain of an audio signal and that can be detected using the example watermark detector 210 include, but are not limited to, examples in which spread spectrum techniques are used to include a watermark in an audio signal. For example, such a watermark can be encoded in the audio signal by (1) spreading the watermark by modulating the watermark with a pseudo-noise sequence and then (2) combining the spread watermark with the audio signal. Detection of such a watermark involves correlating the audio signal (after being watermarked) with the pseudo-noise sequence, which despreads the watermark, thereby permitting the watermark to be detected after the correlation.

In the illustrated example of FIG. 2, the signature generator 215 performs one or more signature generation procedures to generate signatures from one or more characteristics of the audio data obtained by the audio signal sampler 205. In some examples, the signature generator 215 processes the audio data obtained by the audio signal sampler 205 to generate a sequence of signatures at a signature generation time interval (e.g., corresponding to a new signature being generated at intervals of 1 second, 2 second, or any other interval) and/or based on occurrence of one or more events. Each site signature generated by the signature generator 215 is intended to be representative of a respective segment of the media (e.g., corresponding to 1 second, 2 seconds, or some other duration of the media) being presented by the monitored media device, such as the example media device 115. Examples of signature techniques that can be implemented by the signature generator 215 include, but are not limited to, any or all of the techniques described in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008, all of which are hereby incorporated by reference in their respective entireties.

In the illustrated example of FIG. 2, the device meter 105 includes the example device activation detector 110 to determine whether a monitored media device, such as the media device 115, is active based on analyzing the acoustic frequency response exhibited by the audio signal sensed by the microphone 120. In some examples, the device activation detector 110 could be structured to determine the acoustic frequency response of the sensed audio signal by implementing a calibration procedure in conjunction with the monitored media device. For example, the monitored media device could be configured to generate tones at a set of different frequencies, such as tones spaced at 100 Hz intervals in the range of 1 kHz to 5 kHz, or some other arrangement of frequencies. Assuming the energies of the tones are the same, the device activation detector 110 could then determine the variations in the energies of the tones in the sensed audio signal to determine the frequency response exhibited by the audio signal sensed by the microphone 120. The resulting frequency response could then be used as a reference frequency response indicative of the monitored media device being active (e.g., turned on), which could be compared to subsequent frequency responses of the sensed audio signal determined by the device activation detector 110 during operation of the meter 105 to perform media monitoring.

However, such a calibration procedure may be impractical as it would typically involve (1) adapting the media monitored device to generate the calibration tones, (2) providing a mechanism to cause the media monitored device and the meter 105 to invoke the calibration procedure, and (3) utilizing additional processing resources of the meter 105 to enable the device activation detector 110 to process the received calibration tones. Accordingly, to avoid the foregoing drawbacks and reduce consumption of processing resources, the device activation detector 110 of the illustrated example determines the frequency response exhibited by the audio signal sensed by the microphone 120 based on an example procedure that reuses frequency values already determined by the example watermark detector 210 when attempting to decode watermarks in the sensed audio signal. The device activation detector 110 of the illustrated example further uses the presence or absence of valid watermarks detected by the watermark detector 210 to determine whether a frequency response of the sensed audio signal determined by the device activation detector 110 for a given monitoring time interval corresponds to a reference frequency response indicative of the monitored media device being active (e.g., turned on), or is a measured frequency response for which the operational status of the monitored media device is unknown and, therefore, is to be ascertained.

Figure 4:
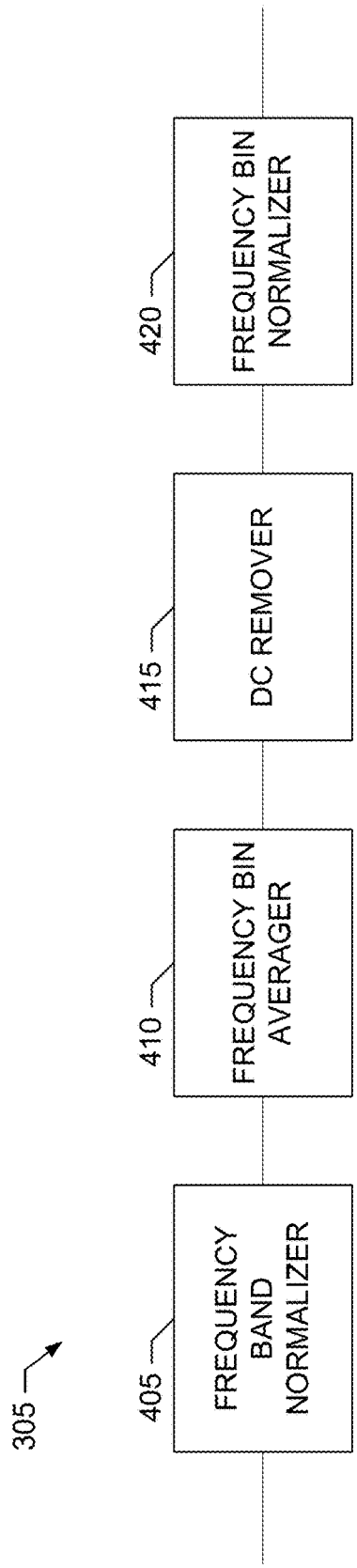
FIG. 4 is a block diagram of an example frequency response determiner that may be used to implement the example device activation detector of FIGS. 1, 2 and/or 3.
Figure 5A:
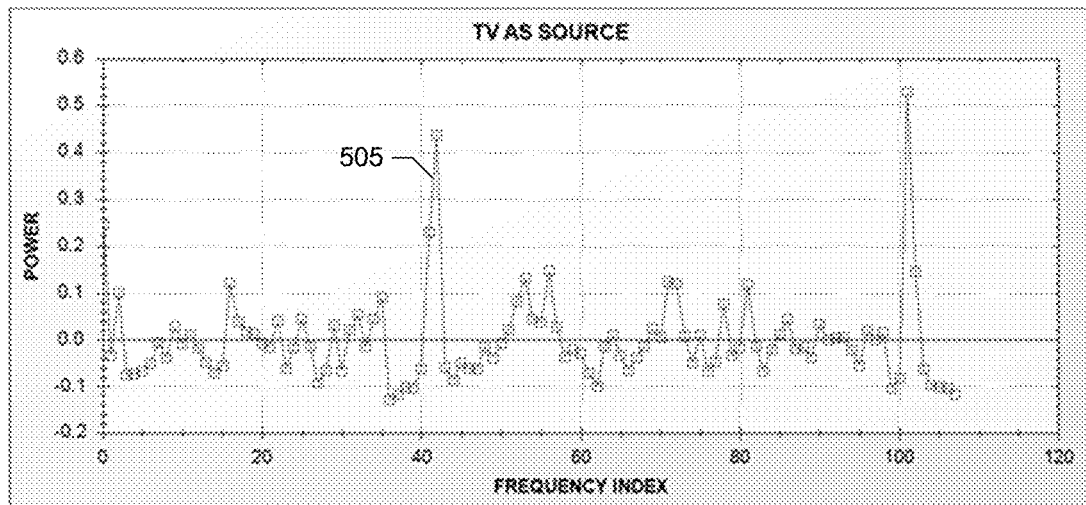
FIGS. 5A-B illustrated example frequency responses determined by the example frequency response determiner of FIG. 4.
Figure 5B:
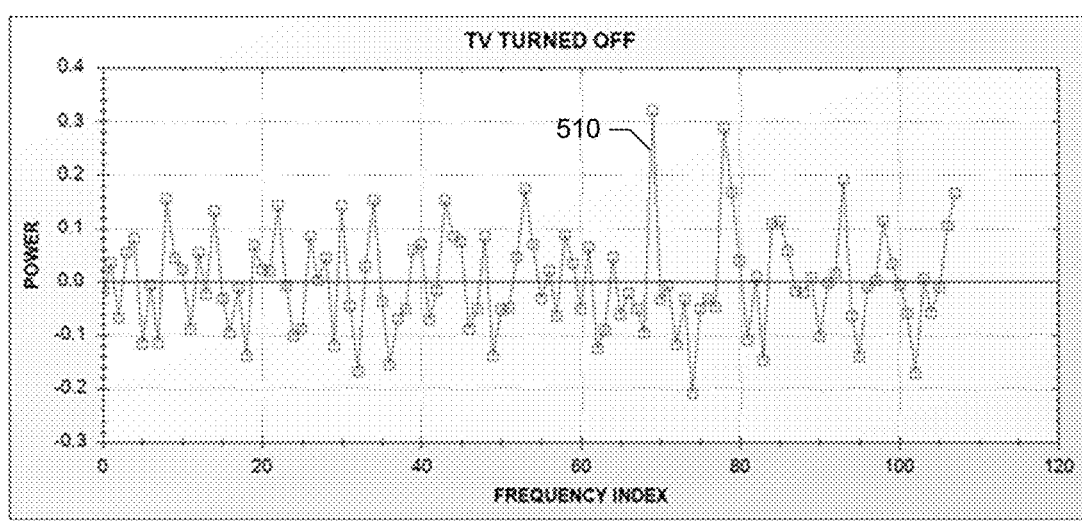

An example implementation of the device activation detector 110 of FIG. 2 is illustrated in FIGS. 3 and 4, which are described in further detail below. Example frequency responses that may be determined by the example device activation detector 110 are depicted in FIGS. 5A-B, which are described in further detail below.

In the illustrated example of FIG. 2, the device activation detector 110 verifies whether watermarks decoded by the watermark detector 210 and/or signatures generated by the signature generator 215 during a given monitoring time interval actually correspond to media presented by the monitored media device, such as the media device 115. For example, if the device activation detector 110 determines that the monitored media device was active (e.g., turned on) during the monitoring time interval, then it is likely that any decoded watermarks and/or generated signatures are representative of the media being presented by the monitored media device. As such, the device activity determination made by the device activation detector 110 (e.g., which indicates that the monitored device is active in this case) may be used to confirm the validity of the decoded watermarks and/or generated signatures corresponding to the monitoring time interval. Conversely, if the device activation detector 110 determines that the monitored media device was inactive (e.g., turned off) during the monitoring time interval, then it is likely that any decoded watermarks and/or generated signatures are not representative of the media being presented by the monitored media device but, instead, are representative of some other audio source and/or correspond to false detections. As such, the device activity determination made by the device activation detector 110 (e.g., which indicates that the monitored device is inactive in this case) may be used to invalidate (e.g., discard) the decoded watermarks and/or generated signatures corresponding to the monitoring time interval.

In some examples, the device activation detector 110 further controls operation of the example signature generator 215 to conserve processing resources by disabling further generation of monitoring data during a given monitoring interval in response to determining that, based on its frequency response analysis, the media device was inactive during the monitoring interval. For example, the meter 105 of FIG. 2 may be structured to invoke the signature generator 215 only when valid watermarks are not detected by the example watermark detector 210 for a given monitoring time interval. In such examples, the device activity determination made by the device activation detector 110 may further condition whether the signature generator 215 is to be invoked when no valid watermarks were detected for the given monitoring time interval. For example, if the frequency response analysis performed by the device activation detector 110 indicates that the monitored media device was inactive during the given monitoring time interval and no valid watermarks were detected by the watermark detector 210, then the device activation detector 110 may prevent the signature generator 215 from generating signatures to conserve processing resources. Otherwise, if no valid watermarks were detected by the watermark detector 210, but the frequency response analysis performed by the device activation detector 110 indicates that the monitored media device was active during the given monitoring time interval, then the device activation detector 110 may enable (e.g., permit) the signature generator 215 to generate signatures for use in monitoring the media presented by the (presumably) active media device.

In some examples, the device activation detector 110 additionally or alternatively provides status information related to the monitored site, such as the example monitored site 100, being monitored by the example meter 105. For example, such status information may include the device activation determination made by the device activation detector 110 based on its frequency response analysis. Additionally or alternatively, in some examples, the device activation detector 110 provides other status information. For example, as mentioned above, the device activation detector 110 determines that a frequency response determined for audio signal sensed by the microphone 120 is a reference frequency response indicative of a monitored media device being active if valid watermark(s) are detected by the watermark detector 210 for the given monitoring time interval. In a subsequent monitoring time interval, the device activation detector 110 determines a new, measured frequency response corresponding to the subsequent time interval. If valid watermarks are detected by the watermark detector 210 for this subsequent monitoring time interval, the device activation detector 110 determines that the new, measured frequency response is also indicative of the monitored media device being active (e.g., turned on). In some examples, the device activation detector 110 also compares the new, measured frequency response with the prior reference frequency response. If the two frequency responses are determined to match (as described below), then the device activation detector 110 indicates that the environment of the monitored site (e.g., the monitored site 100) is unchanged.

However, if the two frequency responses do not match, then the device activation detector 110 indicates that a change in the environment of the monitored site has occurred between the prior monitoring interval and the subsequent interval. For example, the change can correspond to the monitored media device having moved relative to a position of the media device during the prior monitoring time interval, or an arrangement of the environment (such as a position of the microphone 120, position(s) of the room object(s) 140, etc.) has changed relative to the prior monitoring time interval, etc.

In some examples, the device activation detector 110 further checks the signal strength (and/or or some other characteristic(s)) of the audio signal sensed by the microphone 120 when valid watermarks are detected but the reference and measured frequency responses do not match. For example, if the monitored media device (e.g., the media device 115) is inactive, the meter 105 might detect valid watermarks in an audio signal emanating from a media device at another location (e.g., another room). However, the audio signal from this other media device would typically have lower energy than an audio signal received from the monitored media device. Therefore, when valid watermarks are detected but the reference and measured frequency responses do not match, in some examples the device activation detector 110 checks that the signal strength of the sensed audio signal satisfies (e.g., meets or exceeds) a threshold before determining that the prior reference frequency response should be replaced with the new measured frequency response because the environment has changed. Otherwise, if the signal strength of the sensed audio signal does not (e.g., meets or exceeds) satisfy the threshold, in such examples device activation detector 110 determines that the monitored media device is not the source of the sensed signal, and may discards the watermarks and measured frequency response determined for the monitored time interval being processed.

The example device meter 105 includes an example data reporter 220 to receive watermarks decoded by the watermark detector 210, signatures generated by the signature generator 215, device activity determinations and/or other status information provided by the device activation detector 110, and/or any other information determined by the device meter 105. The data reporter 220 stores some or all of the foregoing information as metering data, and reports this metering data via an example network 225 to an example data processing facility 230. The data processing facility 230 performs any appropriate post-processing of the metering data to, for example, determine audience ratings information, identify targeted advertising to be provided to the monitored site 100, etc. In the illustrated example, the network 225 can correspond to any type(s) and/or number of wired and/or wireless data networks, or any combination thereof.

A block diagram of an example implementation of the device activation detector 110 of FIGS. 1 and/or 2 is illustrated in FIG. 3. The example device activation detector 110 of FIG. 3 includes an example frequency response determiner 305 to determine frequency responses of a sensed audio signal (e.g., the audio signal sensed by the microphone 120) for different monitoring time intervals based on an example procedure that reuses frequency values already determined for the sensed audio signal by a watermark detector, such as the example watermark detector 210, when performing watermark decoding for the respective monitoring time intervals. For example, the frequency response determiner 305 may determine (1) a first frequency response based on first frequency values of the sensed audio signal used by the watermark detector 210 to perform watermark detection for a first monitoring time interval, (2) a second frequency response based on second frequency values of the sensed audio signal used by the watermark detector 210 to perform watermark detection for a second monitoring time interval, (3) a third frequency response based on third frequency values of the sensed audio signal used by the watermark detector 210 to perform watermark detection for a third monitoring time interval, etc. An example implementation of the frequency response determiner 305, which implements an example procedure that reuses frequency values already determined for the sensed audio signal by the example watermark detector to determine frequency responses of the sensed audio signal for different monitoring intervals, is illustrated in FIG. 4 and described in further detail below.

The example device activation detector 110 of FIG. 3 also includes an example reference response identifier 310 to identify whether a measured frequency response determined by the frequency response determiner 305 corresponds to a reference frequency response indicative of a monitored media device, such as the media device 115, being active (e.g., turned on). For example, the reference response identifier 310 can be structured to determine that a monitored media device, such as the media device 115, was active during a first monitoring time interval in response to determining that one or more valid watermarks was/were detected (e.g., by the watermark detector 210) when performing watermark detection for the first monitoring time interval. In such examples, the reference response identifier 310 further identifies a first frequency response determined by the frequency response determiner 305 for the first monitoring time interval to be a reference frequency response indicative of the monitored media device being active, because the valid watermark(s) was(were) detected when performing watermark detection for the first monitoring time interval and, thus, indicate that the monitored media device was active during the first time interval. In such examples, the reference response identifier 310 also stores the identified, reference frequency response in an example reference storage 315 for comparison with subsequent frequency responses determined by the frequency response determiner 305. As mentioned above, in some examples, the reference response identifier 310 compares the energy of the sensed audio signal to a threshold to verify that the first frequency response determined for the first monitoring time interval corresponds to the monitored media device (and not some other media device at another location) before identifying the first frequency response to be a new reference frequency response for the monitored media device.

In some examples, the reference response identifier 310 also updates the reference frequency response stored in the reference storage 315 for a monitored media device. For example, the reference response identifier 310 may identify a subsequent frequency response determined by the frequency response determiner 305 for a subsequent monitoring time interval (which may correspond to one or more time intervals after identification of a prior reference frequency response) as a reference frequency response for the monitored media device (e.g., which indicates the monitored media device is active) in response to determining that one or more valid watermarks was/were detected (e.g., by the watermark detector 210) when performing watermark detection for the subsequent monitoring time interval. In some examples, the reference response identifier 310 replaces the reference frequency response stored in the reference storage 315 for the monitored media device with the new, measured frequency response determined by the frequency response determiner 305 for this subsequent monitoring time interval. In some examples, the reference response identifier 310 identifies the new, measured frequency response as another reference frequency response to be compared with subsequent measured frequency responses (e.g., in addition to the prior reference frequency response(s) determined for the monitored media device). The example reference storage 315 may be implemented by any appropriate memory, storage device, etc., such as one or more of the volatile memory 1114 and/or the mass storage device 1128 of the example processor platform 1100 of FIG. 11, which is described in further detail below.

The example device activation detector 110 of FIG. 3 further includes an example comparator 320 to compare the reference frequency response determined by the frequency response determiner 305 for a first (e.g., earlier) monitoring time interval with a measured frequency response determined by the frequency response determiner 305 for a second (e.g., later) monitoring time interval. In some examples, and as described in further detail below, a frequency response determined by the frequency response determiner 305 is represented as a vector of frequency response values over a set of frequency indices. In such examples, the comparator 320 is structured to compute a dot product, or some other correlation metric, of the current measured frequency response (e.g., determined by the frequency response determiner 305 for the second, e.g., later, monitoring time interval) with the reference frequency response retrieved from the reference storage 315 (e.g., and which was determined by the frequency response determiner 305 for the first, e.g., earlier, monitoring time interval). To compute the dot product, for each frequency index, the comparator 320 multiples the corresponding frequency response values for the current measured frequency response and the reference frequency response, and sums the multiplied values to determine the dot product. In some examples, the comparator 320 then compares the dot product result to a threshold to determine whether the current measured frequency response and the reference frequency response match. For example, the comparator 320 may determine that the current measured frequency response and the reference frequency response match if the dot product result satisfies (e.g., meets or exceeds) the threshold, and may determine that the current measured frequency response and the reference frequency response do not match if the dot product result does not satisfy (e.g., does not meet or exceed) the threshold.

In the illustrated example of FIG. 3, the device activation detector 110 also includes an example status evaluator 325 to determine and report status information associated with media device activity. For example, if the comparator 320 determines that the measured frequency response for a given monitoring time interval matches the reference frequency response, then the status evaluator 325 indicates that the monitored media device was active (turned on) during the given monitoring time interval. Conversely, if the comparator 320 determines that the measured frequency response for the given monitoring time interval did not match the reference frequency response, then the status evaluator 325 indicates that the monitored media device was inactive (e.g., turned off) during the given monitoring time interval. In some examples, the status evaluator 325 further compares the energy of the sensed audio signal to a threshold (and/or examines some other characteristic(s) of the sensed audio signal) to distinguish between the monitored media device being inactive and the sensed audio signal being corrupted by another audio source (e.g., ambient acoustic noise, people talking in the vicinity of the monitored media device, audio emanating from some other media device at another location, etc.). For example, if the reference and measured frequency responses did not match and the energy of the audio signal does not satisfy (e.g., is less than or does not exceed) the threshold, then the weak audio signal indicates to the status evaluator 325 that the monitored media device was inactive (e.g., turned off). However, if the reference and measured frequency responses did not match and the energy of the audio signal satisfies (e.g., meets or exceeds) the threshold, then the strong audio signal indicates to the status evaluator 325 that the sensed audio signal was dominated by an audio source other than the monitored media device and, as such, the status of the monitored media device is unknown.

In some examples, the status evaluator 325 further asserts or otherwise outputs a control signal, indication, etc., to condition whether further monitoring data, such as signatures, are to be generated for the given monitoring time interval based on the results of comparing the measured frequency response for the given monitoring time interval with the reference frequency response for the monitored media device. For example, if the comparator 320 determines that the measured frequency response for the given monitoring time interval matches the reference frequency response, then in addition to indicating that the monitored media device was active (turned on), the status evaluator 325 may also assert a control signal, indication, etc., to permit signature generation, such as by the example signature generator 215, to be performed to generate signatures from the sensed audio signal for the given monitoring time interval. However, if the comparator 320 determines that the measured frequency response for the given monitoring time interval does not match the reference frequency response, then in addition to indicating that the monitored media device was inactive (turned off), the status evaluator 325 may also assert a control signal, indication, etc., to prevent signature generation, such as by the example signature generator 215, from being performed for the given monitoring time interval.

In some examples, when the reference response identifier 310 replaces a prior reference response (e.g., determined for a prior first monitoring time interval) with a new reference frequency response determined for a later second, third, etc., time interval, the status evaluator 325 also causes the comparator 320 to compare the new reference frequency response with the prior reference frequency response. For example, the comparator 320 may compute the dot product of the two reference frequency responses and compare the resulting dot product value to the threshold. If the comparator 320 determines the two reference frequency responses match (e.g., their dot product satisfies the threshold), then the status evaluator 325 indicates that the environment of the monitored site (e.g., the monitored site 100) is unchanged. However, if the comparator 320 determines the two reference frequency responses do not match (e.g., their dot product does not satisfy the threshold), then the status evaluator 325 indicates that a position of the monitored media device has moved relative to a prior position, or an environment in which the media device is operating has changed relative to a prior arrangement of the environment, etc.

A block diagram illustrating an example implementation of the frequency response determiner 305 of FIG. 3 is illustrated in FIG. 4. In the illustrated example of FIG. 4, the frequency response determiner 305 is structured to determine a frequency response associated with a sensed audio signal from frequency values used to perform watermark detection (e.g., by the watermark detector 210). Furthermore, the example frequency response determiner 305 of FIG. 4 is structured based on an assumption that the frequency values correspond to spectral power values of the sensed audio signal determined for frequency bins in the frequency range of 3 kHz to 5.3 kHz from samples of the sensed audio signal obtained during a given monitoring interval. Furthermore, the frequency bins are assumed to be grouped into watermark code bands conveying watermark data. In the illustrated example of FIG. 4, the frequency response determiner 305 of FIG. 4 is structured assuming that the frequency values correspond to spectral power values determined for 108 frequency bins grouped into 8 code bands in the frequency range of 3 kHz to 5.3 kHz. Furthermore, the frequency bins in a code band are assumed to be separated from each other by 5.208 Hz. However, other arrangements and groupings of frequency bins and code bands can be supported by the example frequency response determiner 305 of FIG. 4.

In the illustrated example, the frequency response determiner 305 averages the frequency values over a monitoring time interval, such as 10 seconds or some other time period. For example, if the frequency values used to perform watermark detection are determined by the watermark decoder 210 at 100 millisecond intervals, then averaging the frequency values for each frequency bin over the monitoring time interval (e.g., 10 seconds) causes the averaged frequency values to become less dependent on the particular media being presented by the monitored media device and, instead, causes the averaged frequency values to become more dependent on the multipath interference observed in the sensed audio. Accordingly, when the monitored media device is active (e.g., turned on), the averaged frequency values will tend to have a similar distribution across monitoring time interval, whereas the averaged frequency values will tend to change when the monitored media device is inactive (e.g., turned off) and the sensed audio signal is based on audio source(s) other than the monitored media device.

With the foregoing in mind, the example frequency response determiner 305 of FIG. 4 includes an example frequency band normalizer 405 to normalize the spectral power values for the frequency bins based on the average power for the code bands in which the bins reside. For example, let $P_{b,n}(k)$ represent the spectral power of a frequency bin having bin index n, where n=0, 1, . . . , 8, in a code band b, where b=0, 1, . . . , 11, and observed at a time step k. To normalize the spectral power value of the frequency bin n in band b, the frequency band normalizer 405 computes the average power in the band b by summing the individual spectral power values of the frequency bins in the band and dividing by the number of bins in the band. Mathematically, the frequency band normalizer 405 computes the average power in the band b according to Equation 1, which is:

$$P_{b,avg}(k) = \sum_{n=0}^{n=8} P_{b,n}(k) \quad \text{Equation 1}$$

Next, the frequency band normalizer 405 computes the normalized spectral power of frequency bin n in the band b by dividing the spectral power of frequency bin n by the average power in the band b determined according to Equation 1. Mathematically, the frequency band normalizer 405 computes the normalized spectral power of frequency bin n in the band b according to Equation 2, which is:

$$P_{b,n}(k) = \frac{P_{b,n}(k)}{P_{b,avg}} \quad \text{Equation 2}$$

The frequency band normalizer 405 repeats the foregoing computations of Equation 1 and Equation 2 for all the frequency bins n=0, 1, . . . , 8 over all the code bands b=0, 1, . . . , 11.

The example frequency response determiner 305 of FIG. 4 also includes an example frequency bin averager 410 to determine time averaged, normalized spectral power values for the for the different frequency bins normalize. For example, the frequency bin averager 410 computes the time-averaged normalized power of bin n in code band b by summing the normalized spectral power, $p_{b,n}(k)$, of frequency bin n over the monitoring time interval. If the time step, k, corresponds to a time shift of 100 ms, and the monitoring time interval is 10 seconds, then the frequency bin averager 410 of the illustrated example computes the time-averaged normalized power of bin n in code band b mathematically according to Equation 3, which is:

$$p_{b,n,tavg} = \sum_{k=0}^{99} p_{b,n}(k)/100 \quad \text{Equation 3}$$

In Equation 3, the summation is over 100 time steps, k, totaling 10 seconds. The frequency bin averager 410 repeats the foregoing computations of Equation 3 for all the frequency bins n=0, 1, . . . , 8 over all the code bands b=0, 1, . . . , 11.

In the illustrated example of FIG. 4, the example frequency response determiner 305 further includes an example DC remover 415 and an example frequency bin normalizer 420 to convert the resulting distribution of the time-averaged, normalized spectral bin powers, $p_{b,n,tavg}$, for b=0, 1, . . . , 11, and n=0, 1, . . . , 8, into a frequency response represented by a normalized vector of spectral power coefficients. In the illustrated example, as there are 12 code bands (b=0, 1, . . . , 11) and 9 frequency bins (n=0, 1, . . . , 8) in each code band, the resulting frequency response vector will contain 108 elements. In the illustrated example, the DC remover 415 determines the normalized vector of spectral power coefficients, which forms the frequency response, by first computing the direct current (DC) component of the time-averaged, normalized spectral bin powers. Mathematically, the DC remover 415 determines the DC component according to Equation 4, which is:

$$p_{dc} = \sum_{b=0}^{b=11} \sum_{n=0}^{n=8} p_{b,n,tavg} \quad \text{Equation 4}$$

The DC remover 415 then removes the DC component, $p_{dc}$, from the time-averaged, normalized spectral bin powers by subtraction to yield just the alternating current (AC) components of the time-averaged, normalized spectral bin powers. Mathematically, the DC remover 415 removes the DC component from the time-averaged, normalized spectral bin power, $p_{b,n,tavg}$, according to Equation 5, which is:

$$p_{b,n,ac} = p_{b,n,tavg} - p_{dc} \quad \text{Equation 5}$$

Then, the frequency bin normalizer 420 of the illustrated example determines the spectral power coefficient for each frequency bin by dividing the time-averaged, AC spectral power of the frequency bins, $p_{b,n,ac}$, by the normalized power across all bins, i.e. $p_{norm} = \Sigma_{b=0}^{b=11} \Sigma_0^8 p_{b,n,ac}^2$. Mathematically, the spectral power coefficient for frequency bin n in band b is represented by $p_{b,n,resp}$ (as the spectral power coefficient corresponds to the frequency response determined for that bin and band), and is determined by the frequency bin normalizer 420 according to Equation 6, which is $$p_{b,n,resp} = \frac{p_{b,n,ac}}{p_{norm}} \quad \text{Equation 6}$$

The DC remover 415 and the frequency bin normalizer 420 repeat the foregoing computations of Equation 4 through Equation 6 for all the frequency bins n=0, 1, . . . 8 over all the code bands b=0, 1, . . . , 11. In the illustrated example of FIG. 4, the spectral power coefficients, $p_{b,n,resp}$, determined for the frequency bins n=0, 1, . . . , 8 over the code bands b=0, 1, . . . 11 form the frequency response determined using frequency values the $P_{b,n}(k)$ determined and used for watermark detection during the current monitoring time interval. If watermark detection yields one or more valid watermarks for the current monitoring time interval, the resulting frequency response becomes a reference frequency response. Otherwise, the frequency response corresponds to a measured frequency response that is to be compared with a previously determined reference frequency response to determine whether the monitored media device is active.

Example frequency responses 505 and 510 that may be determined by the example frequency response determiner 305 of FIGS. 3 and/or 4 are illustrated in FIGS. 5A and 5B, respectively. The example frequency response 505 corresponds to a frequency response determined by the example frequency response determiner 305 when the monitored media device 115 is active (e.g., turned on). In contrast, the example frequency response 510 corresponds to a frequency response determined by the example frequency response determiner 305 when the monitored media device 115 is inactive (e.g., turned off). As noted above, the example device activation detector 110 may determine that the example frequency response 505 corresponds to the monitored media device being active in response to determining that one or more valid watermarks were detected by the example watermark detector 210 during the monitoring time interval for which the frequency response 505 was computed. As illustrated in FIGS. 5A and 5B, the example frequency response 505 and 510 exhibit substantially different patterns in their respective spectral coefficients. Accordingly, a dot product of these two frequency responses, as determined by the example comparator 320, would likely yield a negative value having a magnitude lower than 0.5. Thus, in some examples, the comparator 320 employs a threshold of 0.5 (or some other value) to determine whether the dot product of two frequency response vectors indicates that the responses match.

While example manners of implementing the meter 105 and the device activation detector 110 are illustrated in FIGS. 1-4, one or more of the elements, processes and/or devices illustrated in FIGS. 1-4 may be combined, divided, re-arranged, omitted, eliminated and/or implemented in any other way. Further, the example microphone 120, the example audio signal sampler 205, the example watermark detector 210, the example signature generator 215, the example data reporter 220, the example network 225, the example data processing facility 230, the example frequency response determiner 305, the example reference response identifier 310, the example reference storage 315, the example comparator 320, the example status evaluator 325, the example frequency band normalizer 405, the example frequency bin averager 410, the example DC remover 415, the example frequency bin normalizer 420 and/or, more generally, the example meter 105 and/or the example device activation detector 110 of FIGS. 1-4 may be implemented by hardware, software, firmware and/or any combination of hardware, software and/or firmware. Thus, for example, any of the example microphone 120, the example audio signal sampler 205, the example watermark detector 210, the example signature generator 215, the example data reporter 220, the example network 225, the example data processing facility 230, the example frequency response determiner 305, the example reference response identifier 310, the example reference storage 315, the example comparator 320, the example status evaluator 325, the example frequency band normalizer 405, the example frequency bin averager 410, the example DC remover 415, the example frequency bin normalizer 420 and/or, more generally, the example meter 105 and/or the example device activation detector 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example meter 105, the example device activation detector 110, the example microphone 120, the example audio signal sampler 205, the example watermark detector 210, the example signature generator 215, the example data reporter 220, the example network 225, the example data processing facility 230, the example frequency response determiner 305, the example reference response identifier 310, the example reference storage 315, the example comparator 320, the example status evaluator 325, the example frequency band normalizer 405, the example frequency bin averager 410, the example DC remover 415 and/or the example frequency bin normalizer 420 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 105 and/or the device activation detector 110 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the example meter 105, the example device activation detector 110, the example microphone 120, the example audio signal sampler 205, the example watermark detector 210, the example signature generator 215, the example data reporter 220, the example network 225, the example data processing facility 230, the example frequency response determiner 305, the example reference response identifier 310, the example reference storage 315, the example comparator 320, the example status evaluator 325, the example frequency band normalizer 405, the example frequency bin averager 410, the example DC remover 415 and/or the example frequency bin normalizer 420 are shown in FIGS. 6-9. In these examples, the machine readable instructions comprise one or more programs for execution by a processor, such as the processors 1012, 1112 and/or 1212 shown in the example processor platforms 1000, 1100 and/or 1200 discussed below in connection with FIGS. 10-12. The one or more programs, or portion(s) thereof, may be embodied in software stored on a tangible computer readable storage medium such as a CD-ROM, a floppy disk, a hard drive, a digital versatile disk (DVD), a Blu-ray Disk™ or a memory associated with the processor 1012, 1112 and/or 1212, but the entire program or programs and/or portions thereof could alternatively be executed by a device other than the processor 1012, 1112 and/or 1212, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-9, many other methods of implementing the example meter 105, the example device activation detector 110, the example microphone 120, the example audio signal sampler 205, the example watermark detector 210, the example signature generator 215, the example data reporter 220, the example network 225, the example data processing facility 230, the example frequency response determiner 305, the example reference response identifier 310, the example reference storage 315, the example comparator 320, the example status evaluator 325, the example frequency band normalizer 405, the example frequency bin averager 410, the example DC remover 415 and/or the example frequency bin normalizer 420 may alternatively be used. For example, with reference to the flowcharts illustrated in FIGS. 6-9, the order of execution of the blocks may be changed, and/or some of the blocks described may be changed, eliminated, combined and/or subdivided into multiple blocks.

As mentioned above, the example processes of FIGS. 6-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-9 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 6:
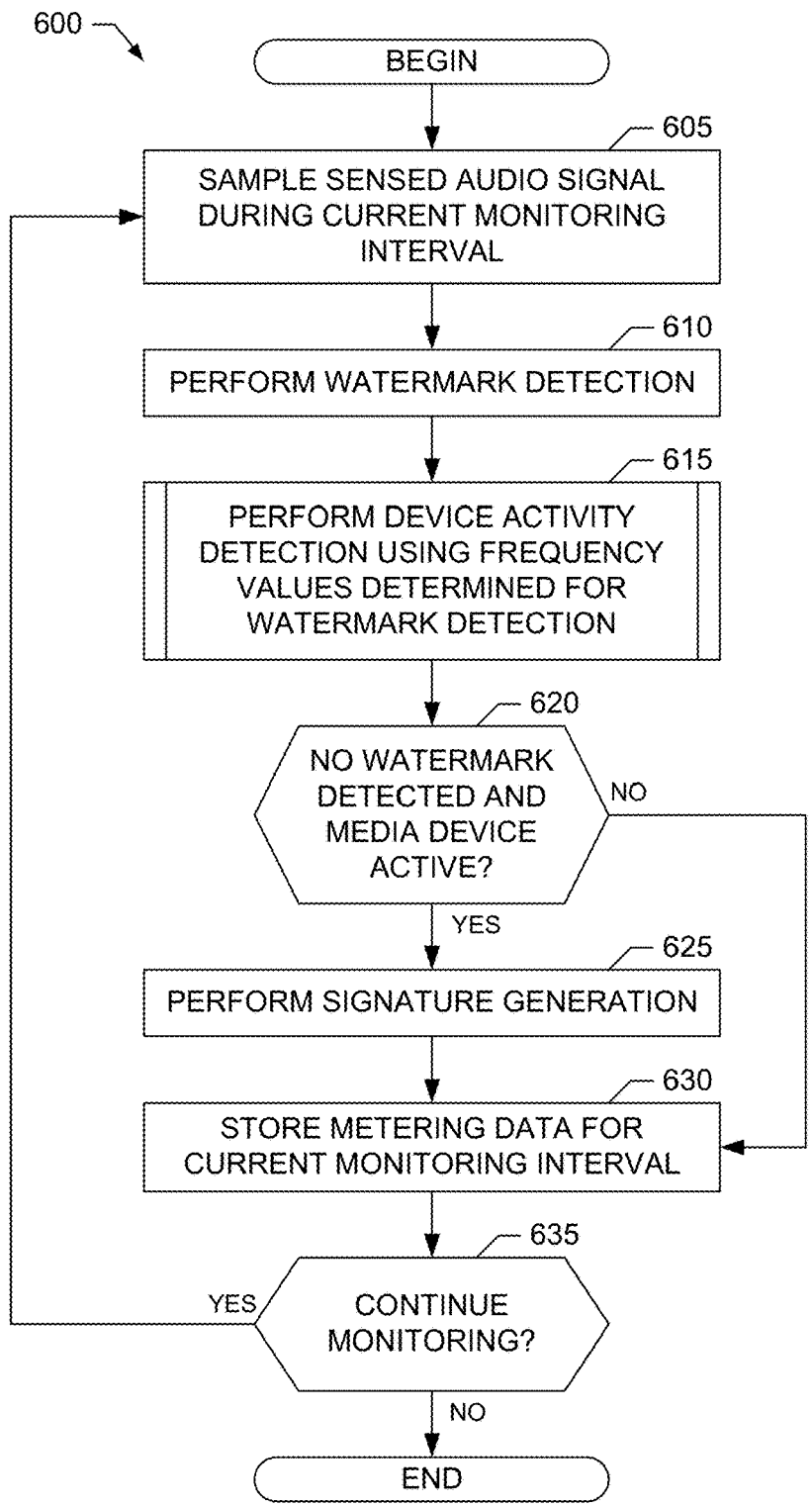
FIG. 6 is a flowchart representative of example machine readable instructions that may be executed to implement the example device meter of FIGS. 1 and/or 2.

An example program 600 that may be executed to implement the example device meter 105 of FIGS. 1 and/or 2 is represented by the flowchart shown in FIG. 6. For convenience and without loss of generality, execution of the example program 600 is described from the perspective of the example device meter 105 of FIG. 2 operating in the example monitored site 100 of FIG. 1. With reference to the preceding figures and associated written descriptions, the example program 600 of FIG. 6 begins execution at block 605 at which the example audio signal sampler 205 of the device meter 105 samples the audio signal output from the microphone 120 for a current monitoring time interval. At block 610, the example watermark detector 210 of the device meter 105 performs watermark detection for the current monitoring time interval using the audio signal samples obtained at block 605. At block 615, the example device activation detector 110 of the device meter 105 performs device activity detection using frequency values determined at block 610 for watermark detection to determine whether a monitored media device (e.g., the media device 115) was active during the current monitoring time interval. An example program that may be executed to perform the processing at block 615 is illustrated in FIG. 7 and described in further detail below.

At block 620, the device activation detector 110 determines whether the following two conditions were met for the current monitoring time interval: (1) no valid watermark was detected at block 610 and (2) the monitored media device was determined to be active at block 615. If both conditions are met (block 620), then processing proceeds to block 625 at which the example signature generator 215 of the device meter 105 generates signatures from the audio samples obtained at block 605. Otherwise, if both condition examined at block 620 are not met, or when processing completes at block 625, processing then proceeds to block 630 at which the example data reporter 220 of the device meter 105 stores the metering data determined by the device meter 105 for the current monitoring time interval for reporting to the example data processing facility 230. For example, at block 630 the data reporter 220 stores the watermark(s), if any, decoded at block 610, the signature(s), if any, generated at block 625, and/or the device activity determinations and/or other status information determined at block 615. At block 635, the device meter 105 determines whether monitoring of the monitored media device is to continue. If monitoring is to continue, processing returns to block 605 and blocks subsequent thereto to perform monitoring for the next monitoring time interval. Otherwise, execution of the example program 600 ends.

Figure 7:
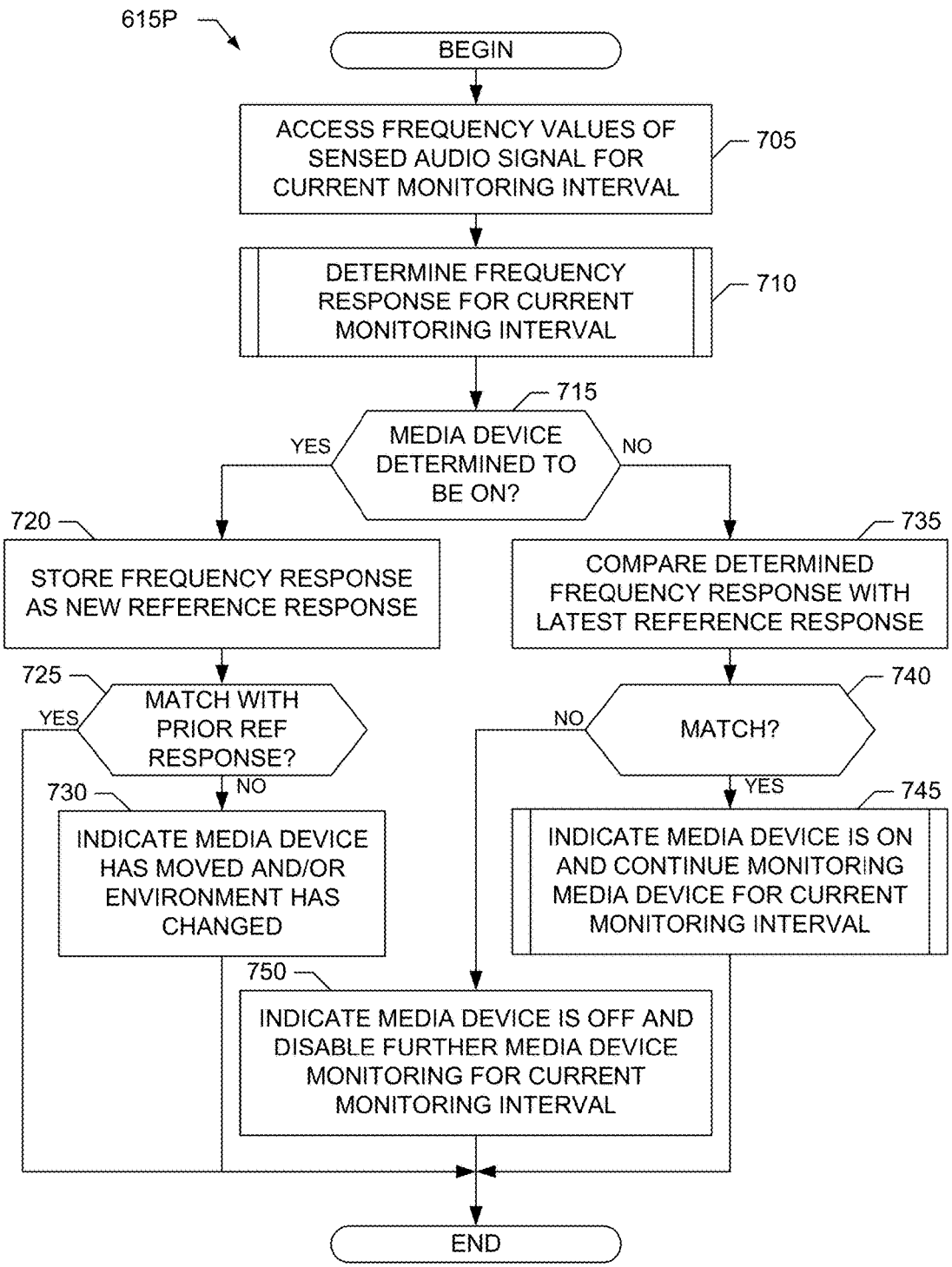
FIG. 7 is a flowchart representative of example machine readable instructions that may be executed to implement the example device activation detector of FIGS. 1, 2 and/or 3.
Figure 9:
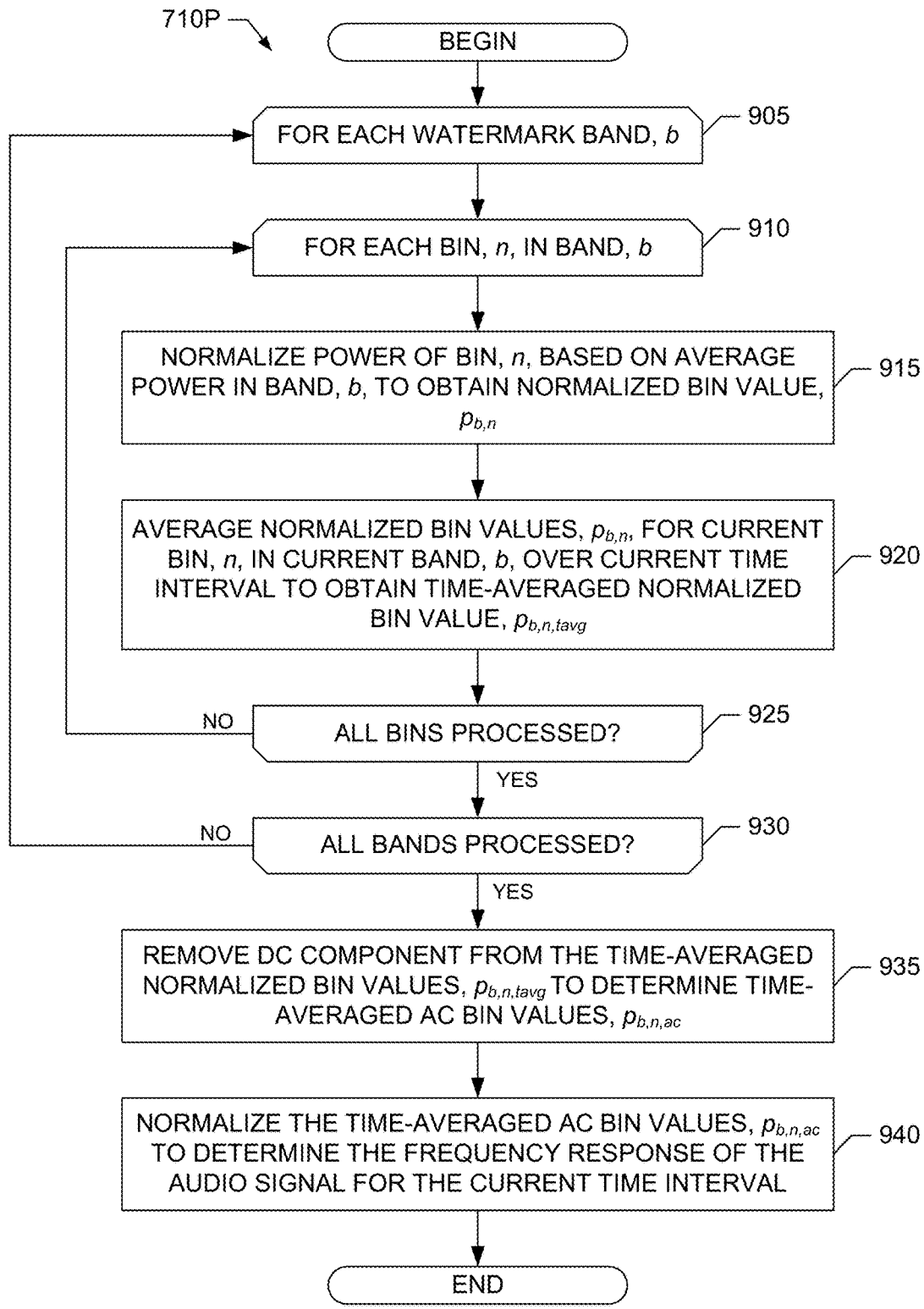
FIG. 9 is a flowchart representative of example machine readable instructions that may be executed to implement the example frequency response determiner of FIG. 4.

An example program 615P that may be executed to implement the example device activation detector 110 of FIGS. 1, 2 and/or 3, and/or that may be used to perform the processing at block 615 of FIG. 6, is represented by the flowchart shown in FIG. 7. For convenience and without loss of generality, execution of the example program 615P is described from the perspective of the example device activation detector 110 of FIG. 3 being included in the example device meter 105 of FIG. 2 and operating in the example monitored site 100 of FIG. 1. With reference to the preceding figures and associated written descriptions, the example program 615P of FIG. 7 begins execution at block 705 at which the example frequency response determiner 305 of the device activation detector 110 accesses the frequency values (e.g., the values $P_{b,n}(k)$ describe above) determined by the watermark detector 210 for performing watermark detection for the current monitoring time interval. At block 710, the frequency response determiner 305 processes the frequency values obtained at block 705 to determine a measured frequency response (e.g., corresponding to the vector of the spectral power coefficients, $p_{b,n,resp}$, described above) of the sensed audio signal for the current monitoring interval. An example program that may be executed to perform the processing at block 710 is illustrated in FIG. 9 and described in further detail below.

At block 715, the example reference response identifier 310 of the device activation detector 110 determines whether the media device is active (e.g., turned on) by, for example, determining whether valid watermarks have been decoded by the watermark detector 210 for the current monitoring time interval. If the media device is determined to be active (block 715), then at block 720 the reference response identifier 310 stores the measured frequency response determined at block 710 in the example reference storage 315 as the latest reference frequency response corresponding to the monitored media device being active. At block 725, the example status evaluator 325 of the device activation detector 110 causes the comparator 320 to compare the current reference frequency response with the prior reference frequency response. If the comparator 320 determines the frequency responses match (block 725), then the monitored environment has not changed and execution of the example program 615P ends. Otherwise, if the comparator 320 determines that the current and prior reference frequency responses do not match (block 725), then at block 730 the status evaluator 325 indicates that (1) the position of the monitored media device has changed since generation of the prior reference frequency spectrum, and/or (2) the arrangement of the environment at the monitored site 100 has changed since generation of the prior reference frequency spectrum. Execution of the example program 615P then ends.

Figure 8:
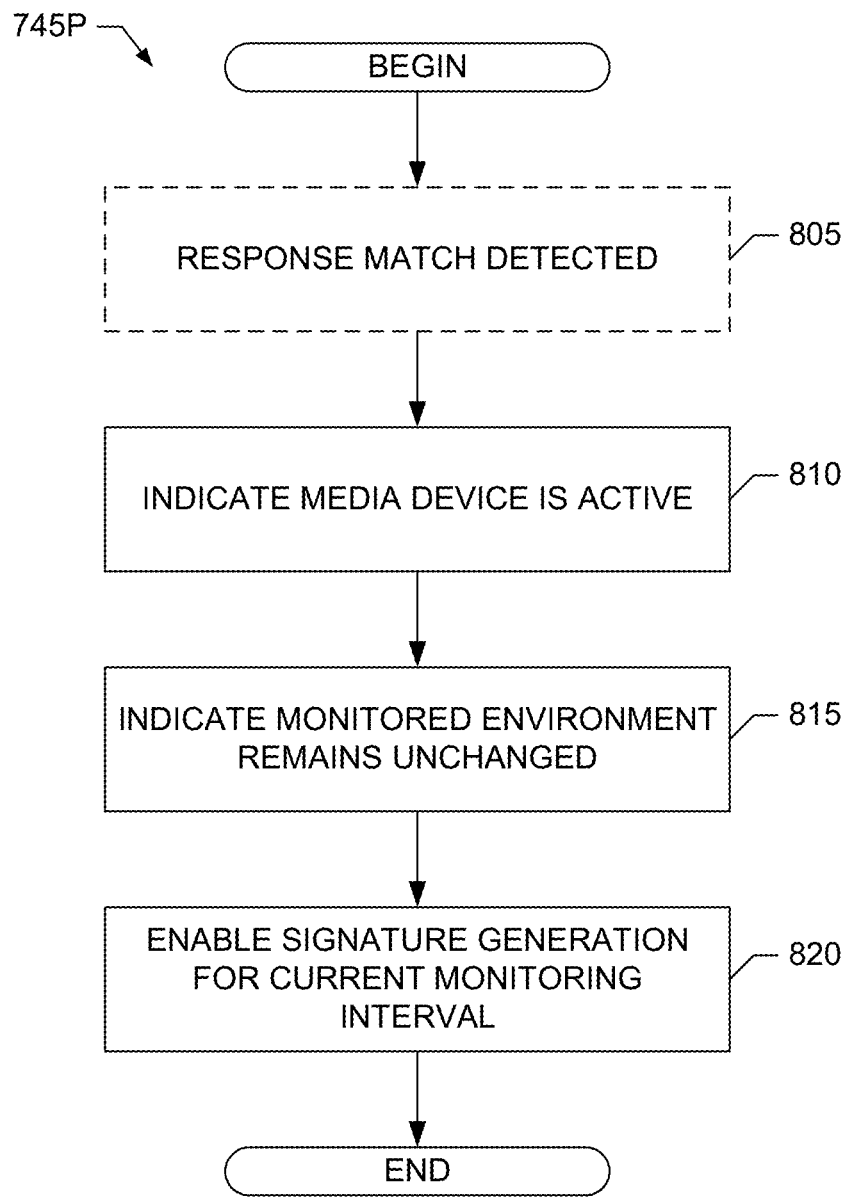
FIG. 8 a flowchart representative of example machine readable instructions that may be executed to perform further processing in the example device activation detector of FIGS. 1, 2 and/or 3 when a monitored media device is determined to be active (e.g., turned on).

Returning to block 715, if reference response identifier 310 is unable to determine that the monitored media device is active during the current monitoring time interval (e.g., because no valid watermarks have been detected), then at block 735 the comparator 320 compares the measured frequency response determined at block 710 with the latest reference frequency response indicative of the monitored media device being active. If at block 740 the comparator 320 determines that the measured frequency response and the reference frequency response match (e.g., because their dot product satisfies a threshold), then at block 745 the status evaluator 325 indicates that the monitored media device (e.g., the media device 115) was active (e.g., turned on) for the current monitoring time interval, and permits further media device monitoring to be performed for at least the remainder of the current monitoring time interval. An example program that may be executed to perform the processing at block 745 is illustrated in FIG. 8 and described in further detail below. Otherwise, if the comparator 320 determines that the measured frequency response and the reference frequency response do not match (e.g., because their dot product does not satisfy a threshold), then at block 750 the status evaluator 325 indicates that the monitored media device (e.g., the media device 115) was inactive (e.g., turned off) for the current monitoring time interval, and disables further media device monitoring for at least the remainder of the current monitoring time interval. Execution of the example program 615P then ends.

An example program 745P that may be used to perform the processing at block 745 of FIG. 7 is represented by the flowchart shown in FIG. 8. With reference to the preceding figures and associated written descriptions, the example program 745P of FIG. 8 begins execution at block 805 at which the comparator 320 determines that the measured frequency response and the reference frequency response match (e.g., because their dot product satisfies a threshold). At block 810, the status evaluator 325 indicates that the monitored media device (e.g., the media device 115) was active during the current monitoring time interval (e.g., because the measured frequency device was determined to match the reference frequency response indicative of the monitored media device being active). In some examples, at block 815, the status evaluator 325 indicates that the monitored environment at the monitored site 100 remains unchanged relative to the prior monitoring time interval. At block 820 the status evaluator 325 further asserts or otherwise outputs a control signal, indication, etc., to enable the signature generator 215 to generate signatures from the sensed audio signal for the current monitoring interval. Execution of the example program 745P then ends.

An example program 710P that may be executed to implement the example frequency response determiner 305 of FIGS. 3 and/or 4, and/or that may be used to perform the processing at block 710 of FIG. 7, is represented by the flowchart shown in FIG. 9. For convenience and without loss of generality, execution of the example program 710P is described from the perspective of the example frequency response determiner 305 of FIG. 4 being included in the example device activation detector 110 of FIG. 3. With reference to the preceding figures and associated written descriptions, the example program 710P of FIG. 9 begins execution at blocks 905 and 910 at which the frequency response determiner 305 begins iterating through the frequency bins and the watermark code bands defined for the frequency spectrum of the sensed audio signal. For example, at block 915, the example frequency band normalizer 405 of the frequency response determiner 305 normalizes (e.g., using Equation 1 and Equation 2 as disclosed above) the frequency values, namely, the spectral power values, $P_{b,n}(k)$, to determine the normalized spectral power, $p_{b,n}(k)$, for the frequency bin n in the watermark band b corresponding to the current processing iteration. At block 920, the example frequency bin averager 410 of the frequency response determiner 305 averages (e.g., using Equation 3 as disclosed above) the normalized spectral power, $p_{b,n}(k)$, over time, k, for the frequency bin n in the watermark band b to determine the time-averaged normalized power, $p_{b,n,tavg}$, for the frequency bin n in the watermark band b corresponding to the current processing iteration. Iteration then continues at block 925 and 930 until values of the time-averaged normalized power, $p_{b,n,tavg}$, are determined for all frequency bins n in all watermark bands b.

Next, at block 935 the example DC remover 415 of the frequency response determiner 305 removes (e.g., using Equation 4 and Equation 5, as disclosed above) the DC component from the time-averaged normalized power, $p_{b,n,tavg}$, to determine the time-averaged, AC spectral power, $p_{b,n,ac}$, of frequency bin n in watermark band b. At block 940, the example frequency bin normalizer 420 of the frequency response determiner 305 normalizes (e.g., using Equation 6, as disclosed above) the time-averaged, AC spectral powers, $p_{b,n,ac}$, frequency of the bins n in the watermark bands b to determine the spectral power coefficients, $p_{b,n,resp}$, for the bins n in the bands b, which correspond to the frequency response of the sensed audio signal determined for the current monitoring time interval. Execution of the example program 710P then ends.

Figure 10:
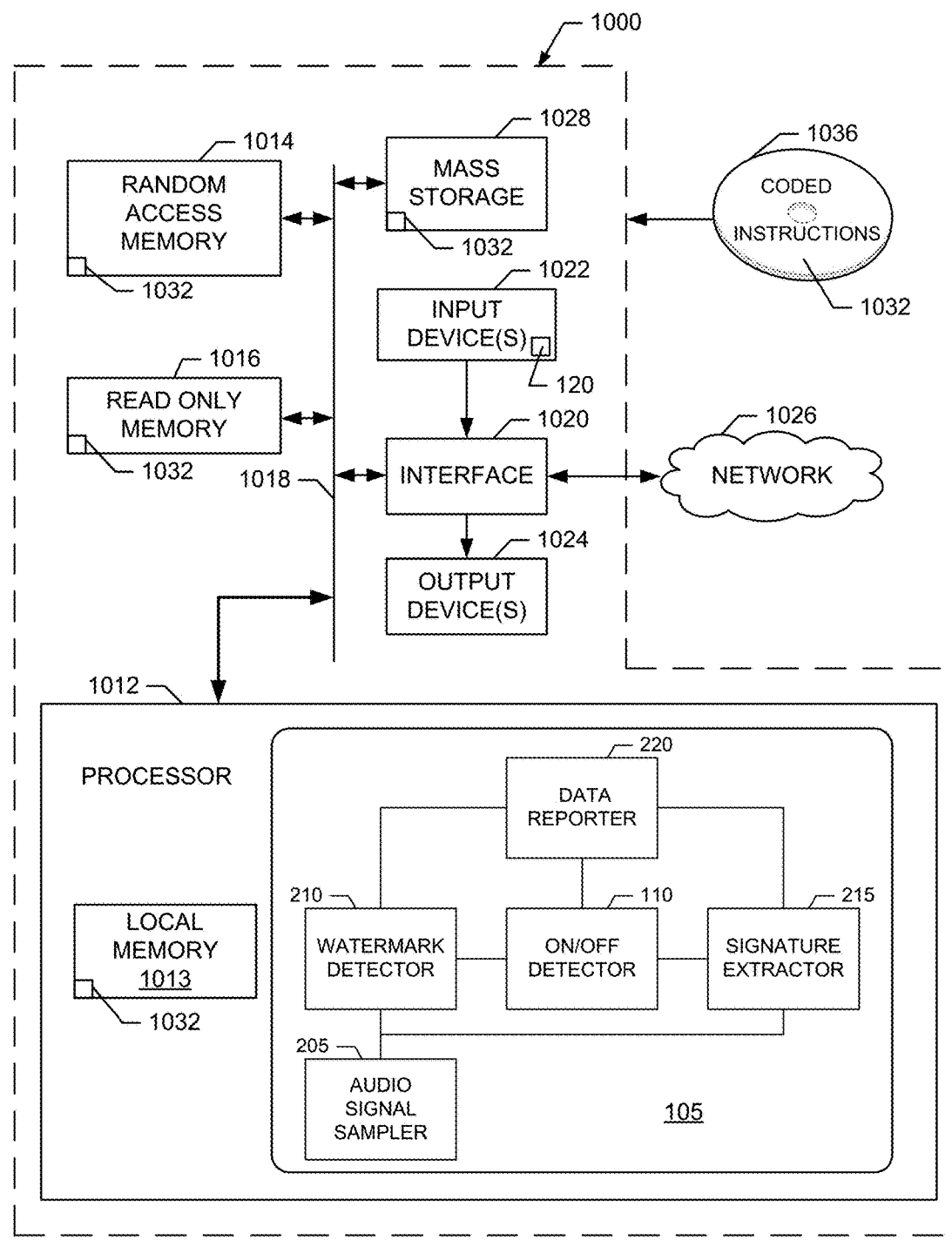
FIG. 10 is a block diagram of an example processor platform structured to execute the example machine readable instructions of FIG. 6 to implement the example device meter of FIGS. 1 and/or 2.

FIG. 10 is a block diagram of an example processor platform 1000 capable of executing the instructions of FIG. 6 to implement the example meter 105 of FIGS. 1 and/or 2. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example of FIG. 10, the processor 1012 is configured via example instructions 1032 to implement the example meter 105, the example device activation detector 110, the example microphone 120, the example audio signal sampler 205, the example watermark detector 210, the example signature generator 215, the example data reporter 220, the example network 225, and/or the example data processing facility 230 of FIGS. 1 and/or 2.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition. In the illustrated example of FIG. 10, the input device(s) 1022 include the example microphone 120.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID (redundant array of independent disks) systems, and digital versatile disk (DVD) drives.

Coded instructions 1032 corresponding to the instructions of FIG. 6 may be stored in the mass storage device 1028, in the volatile memory 1014, in the non-volatile memory 1016, in the local memory 1013 and/or on a removable tangible computer readable storage medium, such as a CD or DVD 1036.

Figure 11:
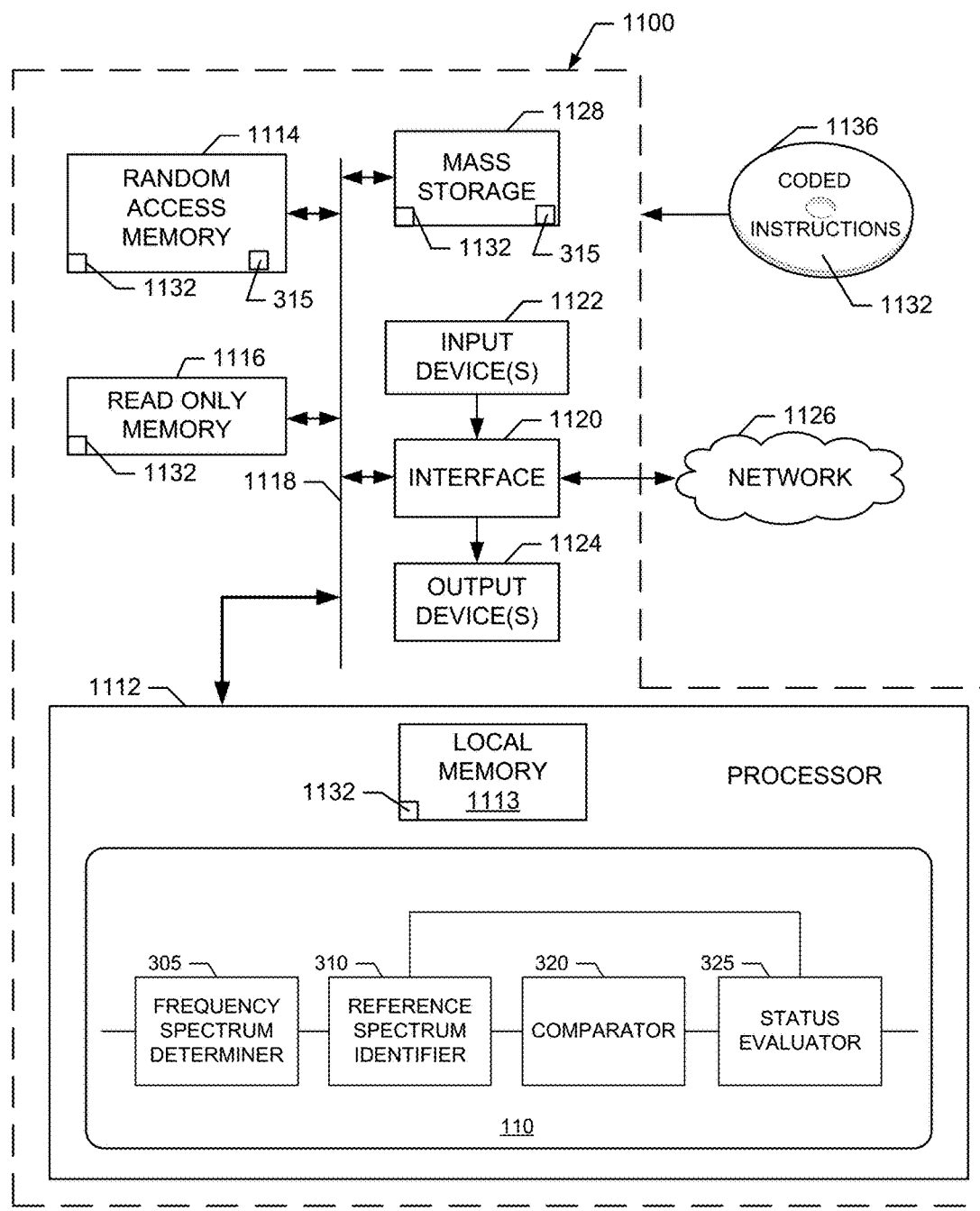
FIG. 11 is a block diagram of an example processor platform structured to execute the example machine readable instructions of FIGS. 7 and/or 8 to implement the example device activation detector of FIGS. 1, 2 and/or 3.

FIG. 11 is a block diagram of an example processor platform 1100 capable of executing the instructions of FIGS. 7 and/or 8 to implement the example device activation detector 110 of FIGS. 1, 2 and/or 3. The processor platform 1100 can be, for example, a server, a personal computer, a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box a digital camera, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example of FIG. 11, the processor 1112 is configured via example instructions 1132 to implement the example device activation detector 110, the example frequency response determiner 305, the example reference response identifier 310, the example comparator 320 and/or the example status evaluator 325 of FIGS. 1, 2 and/or 3.

The processor 1112 of the illustrated example includes a local memory 1113 (e.g., a cache). The processor 1112 of the illustrated example is in communication with a main memory including a volatile memory 1114 and a non-volatile memory 1116 via a link 1118. The link 1118 may be implemented by a bus, one or more point-to-point connections, etc., or a combination thereof. The volatile memory 1114 may be implemented by SDRAM, DRAM, RDRAM and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a USB, and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1100, can allow the user to control the computer system and provide data to the computer using physical gestures, such as, but not limited to, hand or body movements, facial expressions, and face recognition.

One or more output devices 1124 are also connected to the interface circuit 1120 of the illustrated example. The output devices 1124 can be implemented, for example, by display devices (e.g., an LED, an OLED, a liquid crystal display, a CRT, a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a DSL, a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and DVD drives. In some examples, the mass storage device

1128 may implement the example reference storage 315. Additionally or alternatively, in some examples the volatile memory 1114 may implement the example reference storage 315.

Coded instructions 1132 corresponding to the instructions of FIGS. 7 and/or 8 may be stored in the mass storage device 1128, in the volatile memory 1114, in the non-volatile memory 1116, in the local memory 1113 and/or on a removable tangible computer readable storage medium, such as a CD or DVD 1136.

Figure 12:
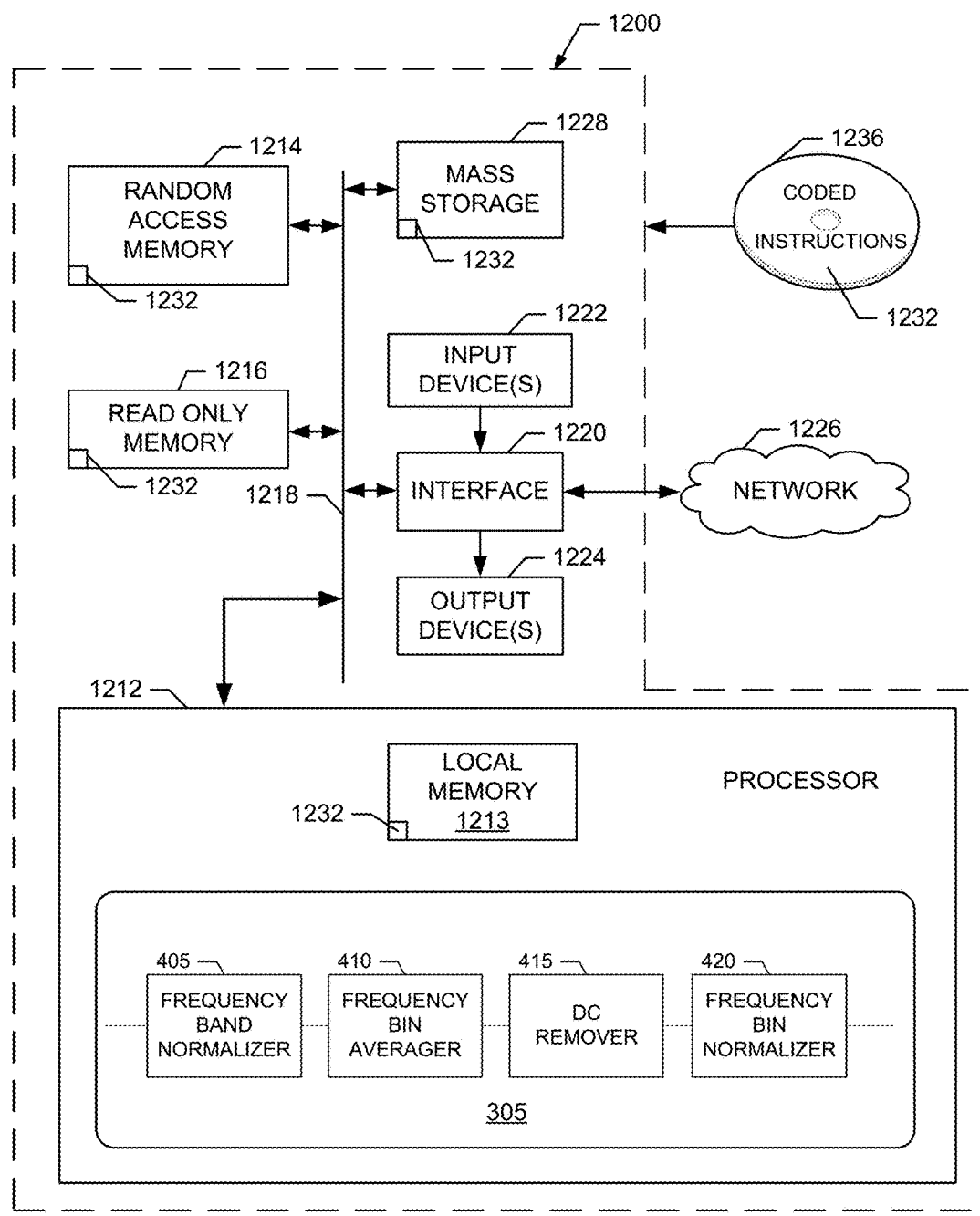
FIG. 12 is a block diagram of an example processor platform structured to execute the example machine readable instructions of FIG. 8 to implement the example frequency response determiner of FIG. 4.

FIG. 12 is a block diagram of an example processor platform 1200 capable of executing the instructions of FIG. 9 to implement the example frequency response determiner 305 of FIGS. 3 and/or 4. The processor platform 1200 can be, for example, a server, a personal computer, a mobile device (e.g., a cell phone, a smart phone, a tablet such as an iPad™), a PDA, an Internet appliance, a DVD player, a CD player, a digital video recorder, a Blu-ray player, a gaming console, a personal video recorder, a set top box a digital camera, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example of FIG. 12, the processor 1212 is configured via example instructions 1232 to implement the example frequency response determiner 305, the example frequency band normalizer 405, the example frequency bin averager 410, the example DC remover 415 and/or the example frequency bin normalizer 420 of FIGS. 3 and/or 4.

The processor 1212 of the illustrated example includes a local memory 1213 (e.g., a cache). The processor 1212 of the illustrated example is in communication with a main memory including a volatile memory 1214 and a non-volatile memory 1216 via a link 1218. The link 1218 may be implemented by a bus, one or more point-to-point connections, etc., or a combination thereof. The volatile memory 1214 may be implemented by SDRAM, DRAM, RDRAM and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a USB, and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1200, can allow the user to control the computer system and provide data to the computer using physical gestures, such as, but not limited to, hand or body movements, facial expressions, and face recognition.

One or more output devices 1224 are also connected to the interface circuit 1220 of the illustrated example. The output devices 1224 can be implemented, for example, by display devices (e.g., an LED, an OLED, a liquid crystal display, a CRT, a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a DSL, a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

Coded instructions 1232 corresponding to the instructions of FIG. 9 may be stored in the mass storage device 1228, in the volatile memory 1214, in the non-volatile memory 1216, in the local memory 1213 and/or on a removable tangible computer readable storage medium, such as a CD or DVD 1236.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A meter to monitor a media device, the meter comprising:
   a microphone to sense audio;
   a device activation detector to:
      reuse first frequency values of the sensed audio to determine a first frequency response of the sensed audio, the first frequency values having been determined to perform watermark detection during a first monitoring time interval;
      compare the first frequency response to a reference frequency response to determine whether the media device was active during the first monitoring time interval; and
      control operation of the meter based on the determination of whether the media device was active during the first monitoring time interval; and
   a data reporter to output a device activity determination indicating whether the media device was active during the first monitoring time interval.

2. The meter of claim 1, wherein the device activation detector is further to determine the reference frequency response based on second frequency values of the sensed audio that were used to detect a valid watermark during a second monitoring time interval prior to the first monitoring time interval.

3. The meter of claim 1, wherein, when a valid watermark is detected during the first monitoring time interval, the device activation detector is further to:
   indicate an environment including the media device is unchanged when the first frequency response matches the reference frequency response; and
   indicate the environment including the media device has changed when the first frequency does not match the reference frequency response.

4. The meter of claim 3, wherein, when the first frequency response does not match the reference frequency response, the device activation detector is further to:

replace the reference frequency response with the first frequency response when a signal strength of the sensed audio satisfies a threshold; and discard the valid watermark and the first frequency response when the signal strength of the sensed audio does not satisfy the threshold.

5. The meter of claim 3, wherein the device activation detector is to determine whether the first frequency response matches the reference frequency response by:

computing a dot product of the first frequency response and the reference frequency response;

determining that the first frequency response matches the reference frequency response when the dot product satisfies a threshold; and determining that the first frequency response does not match the reference frequency response when the dot product does not satisfy the threshold.

6. The meter of claim 1, wherein the device activation detector is to:

determine the media device was active during the first monitoring time interval when the first frequency response matches the reference frequency response; and determine the media device was inactive during the first monitoring time interval when the first frequency response does not match the reference frequency response and a valid watermark is not detected during the first monitoring time interval.

7. The meter of claim 1, wherein the device activity determination is a first device activity determination, and the data reporter is to report metering data to a data processing facility via a network, the metering data including watermarks detected by the watermark detector and device activity determinations made by the device activation detector, the device activity determinations including the first device activity determination.

8. A method to monitor a media device with a meter, the method comprising:

reusing first frequency values of audio sensed with a microphone to determine, by executing an instruction with a processor, a first frequency response of the sensed audio, the first frequency values having been determined to perform watermark detection during a first monitoring time interval;

comparing, by executing an instruction with the processor, the first frequency response to a reference frequency response to determine whether the media device was active during the first monitoring time interval;

controlling, by executing an instruction with the processor, operation of the meter based on the determination of whether the media device was active during the first monitoring time interval; and outputting, by executing an instruction with the processor, a device activity determination indicating whether the media device was active during the first monitoring time interval.

9. The method of claim 8, further including determining the reference frequency response based on second frequency values of the sensed audio that were used to detect a valid watermark during a second monitoring time interval prior to the first monitoring time interval.

10. The method of claim 8, further including:

detecting a valid watermark during the first monitoring time interval;

indicating an environment including the media device is unchanged in response to determining the first frequency response matches the reference frequency response; and indicating the environment including the media device has changed in response to determining the first frequency does not match the reference frequency response.

11. The method of claim 10, further including, in response to determining the first frequency does not match the reference frequency response:

comparing a signal strength of the sensed audio to a threshold;

replacing the reference frequency response with the first frequency response when the signal strength of the sensed audio satisfies the threshold; and discarding the valid watermark and the first frequency response when the signal strength of the sensed audio does not satisfy the threshold.

12. The method of claim 10, wherein the determining of whether the first frequency response matches the reference frequency response includes:

computing a dot product of the first frequency response and the reference frequency response;

determining that the first frequency response matches the reference frequency response when the dot product satisfies a threshold; and determining that the first frequency response does not match the reference frequency response when the dot product does not satisfy the threshold.

13. The method of claim 8, further including:

determining the media device was active during the first monitoring time interval when the first frequency response matches the reference frequency response; and determining the media device was inactive during the first monitoring time interval when the first frequency response does not match the reference frequency response and a valid watermark was not detected during the first monitoring time interval.

14. The method of claim 8, further including:

not detecting a valid watermark during the first monitoring time interval;

enabling signature generation during the first monitoring time interval in response to determining the first frequency response matches the reference frequency response; and disabling signature generation during the first monitoring time interval in response to determining the first frequency does not match the reference frequency response.

15. A non-transitory computer readable medium comprising computer readable instructions that, when executed by a processor of a meter, cause the processor to at least:

reuse first frequency values of audio sensed with a microphone to determine a first frequency response of the sensed audio, the first frequency values having been determined to perform watermark detection during a first monitoring time interval;

compare the first frequency response to a reference frequency response to determine whether a media device was active during the first monitoring time interval;

control operation of the meter based on the determination of whether the media device was active during the first monitoring time interval; and output a device activity determination indicating whether the media device was active during the first monitoring time interval.

16. The computer readable medium of claim 15, wherein the instructions, when executed, further cause the processor to determine the reference frequency response based on second frequency values of the sensed audio that were used to detect a valid watermark during a second monitoring time interval prior to the first monitoring time interval.

17. The computer readable medium of claim 15, wherein the instructions, when executed, further cause the processor to:
- detect a valid watermark during the first monitoring time interval;
- indicate an environment including the media device is unchanged when the first frequency response matches the reference frequency response; and
- indicate the environment including the media device has changed when the first frequency does not match the reference frequency response.

18. The computer readable medium of claim 17, wherein, when the first frequency does not match the reference frequency response, the instructions, when executed, further cause the processor to:
- compare a signal strength of the sensed audio to a threshold;
- replace the reference frequency response with the first frequency response when the signal strength of the sensed audio satisfies the threshold; and
- discard the valid watermark and the first frequency response when the signal strength of the sensed audio does not satisfy the threshold.

19. The computer readable medium of claim 15, wherein the instructions, when executed, further cause the processor to:
- determine the media device was active during the first monitoring time interval when the first frequency response matches the reference frequency response; and
- determine the media device was inactive during the first monitoring time interval when the first frequency response does not match the reference frequency response and a valid watermark was not detected during the first monitoring time interval.

20. The computer readable medium of claim 15, wherein, when a valid watermark is not detected during the first monitoring time interval, the instructions, when executed, further cause the processor to:
- enable signature generation during the first monitoring time interval in response to determining the first frequency response matches the reference frequency response; and
- disable signature generation during the first monitoring time interval in response to determining the first frequency does not match the reference frequency response.

* * * * *